US011751198B2

(12) United States Patent
Yang et al.

(10) Patent No.: US 11,751,198 B2
(45) Date of Patent: Sep. 5, 2023

(54) DISCONTINUOUS RECEPTION FOR SIDELINK

(71) Applicant: QUALCOMM Incorporated, San Diego, CA (US)

(72) Inventors: Wei Yang, San Diego, CA (US); Seyedkianoush Hosseini, San Diego, CA (US); Wanshi Chen, San Diego, CA (US); Tugcan Aktas, La Jolla, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/380,587

(22) Filed: Jul. 20, 2021

(65) Prior Publication Data

US 2022/0046622 A1 Feb. 10, 2022

Related U.S. Application Data

(60) Provisional application No. 63/062,199, filed on Aug. 6, 2020.

(51) Int. Cl.
*H04W 72/20* (2023.01)
*H04L 1/18* (2023.01)
(Continued)

(52) U.S. Cl.
CPC .............. *H04W 72/20* (2023.01); *H04L 1/18* (2013.01); *H04W 72/12* (2013.01); *H04W 76/28* (2018.02)

(58) Field of Classification Search
CPC ......... H04W 72/0406; H04W 72/1205; H04W 76/28; H04W 72/0446; H04W 76/14;
(Continued)

(56) References Cited

U.S. PATENT DOCUMENTS 10,785,753 B1\* 9/2020 Li ........................ H04L 5/0044
11,233,607 B2\* 1/2022 He ........................ H04L 1/0061
(Continued)

OTHER PUBLICATIONS

International Search Report and Written Opinion—PCT/US2021/042496—ISA/EPO—dated Nov. 16, 2021.
(Continued)

*Primary Examiner* — Afshawn M Towfighi
(74) *Attorney, Agent, or Firm* — Procopio, Cory, Hargreaves & Savitch LLP

(57) ABSTRACT

The apparatus of the wireless communication may include a first wireless device configured to transmit sidelink control information (SCI) reserving periodic resources for an initial transmission and aperiodic resources for one or more retransmissions over a sidelink, transmit the initial transmission using the periodic resources, and transmit the one or more retransmissions using the aperiodic resources. The apparatus of wireless communication may also include a second wireless device may be configured to receive the SCI indicating the set of resources for the sidelink transmission from the first wireless device, determine a first resource in the set of resources is periodically reserved, and determine one or more remaining resources in the set of resources is aperiodically reserved.

30 Claims, 16 Drawing Sheets

(51) Int. Cl.
*H04W 76/28* (2018.01)
*H04W 72/12* (2023.01)

(58) Field of Classification Search
CPC . H04W 72/02; H04L 1/18; H04L 1/08; H04L 1/189; H04L 1/1893; H04L 2001/0092; H04L 1/1896
See application file for complete search history.

(56) References Cited

U.S. PATENT DOCUMENTS

| | | | |
|---|---|---|---|
| 2020/0029340 A1* | 1/2020 | He | H04W 76/14 |
| 2020/0229171 A1 | 7/2020 | Khoryaev et al. | |
| 2020/0288435 A1* | 9/2020 | Kwak | H04W 76/27 |
| 2020/0336253 A1* | 10/2020 | He | H04W 4/40 |
| 2022/0022179 A1* | 1/2022 | Fouad | H04W 4/40 |

OTHER PUBLICATIONS

Itri: "Remaining Issues on NR Sidelink Mode 2 Resource Allocation", 3GPP Draft, R1-2000695, 3GPP TSG RAN WG1 #100-e, vol. RAN WG1, No. e-Meeting, Feb. 14, 2020, XP051853023, 6 Pages, Retrieved from the Internet: URL:https://ftp.3gpp.org/tsg_ran/WG1_RL1/TSGR1_100_e/Docs/R1-2000695.zip, p. 2-p. 5.

* cited by examiner

DISCONTINUOUS RECEPTION FOR SIDELINK

CROSS REFERENCE TO RELATED APPLICATION(S)

This application claims the benefit of and priority to U.S. Provisional Application Ser. No. 63/062,199, entitled "METHOD AND APPARATUS FOR DISCONTINUOUS RECEPTION FOR SIDELINK" and filed on Aug. 6, 2020, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit sidelink control information (SCI) reserving periodic resources for an initial transmission and aperiodic resources for one or more retransmissions over a sidelink, transmit the initial transmission using the periodic resources, and transmit the one or more retransmissions using the aperiodic resources.

In an aspect of the disclosure, a method, a computer-readable medium, and an apparatus are provided. The apparatus may receive the SCI indicating the set of resources for the sidelink transmission from the first wireless device, determine that the first set of resources includes a first resource that is periodically reserved and one or more remaining resources that are aperiodically reserved, and perform sensing or resource reservation based on the first resource as a periodic resource and the one or more remaining resources as aperiodic resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
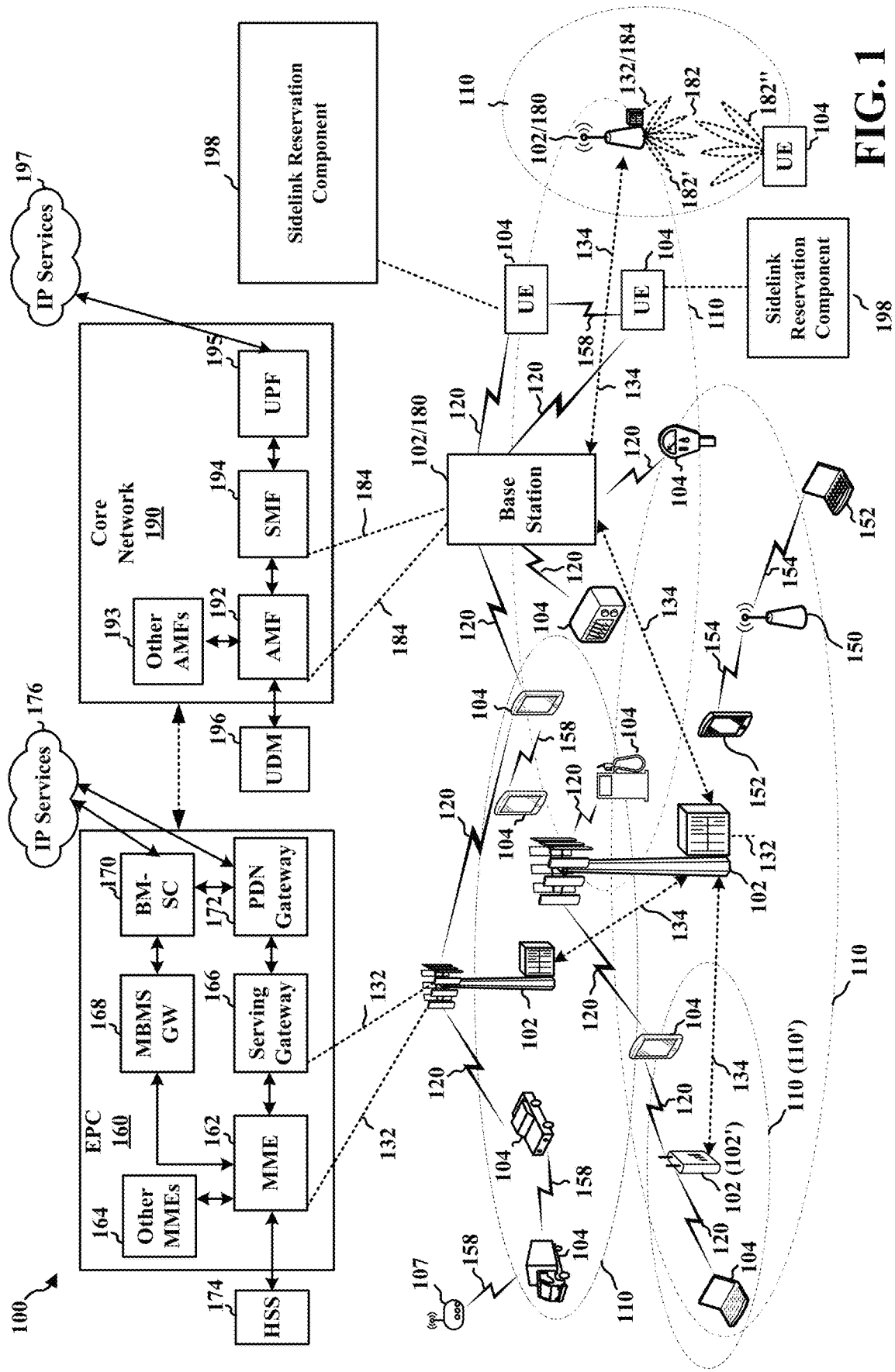
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A UE may reduce power consumption through discontinuous reception (DRX) in which the UE monitors for communication or transmits communication during a DRX ON duration and does not monitor for communication or transmit communication during a DRX OFF duration. The DRX OFF duration may correspond to a time during which the UE operates in a lower power mode, a sleep mode, etc. By having periods during which the UE does not monitor for or transmit communication, the UE may save power or extend battery life for the UE. However, sidelink communication that is exchanged direction between devices may rely on discovery messages for sidelink UEs to find nearby UEs or may rely on sensing of resource reservations by other UEs in order to select resources for transmission. A UE in a DRX OFF duration will miss discovery messages from other UEs and will not sense resource reservations. If multiple UEs operate using different DRX patterns, discovery between UEs may become more difficult.

Aspects presented herein may provide for sidelink resource reservation and sensing for sidelink resource reservations that may improve sidelink communication that includes DRX, or partial sensing, by a UE. As presented herein, the UE may transmit a sidelink control information (SCI) reserving periodic resources for an initial transmission and aperiodic resources for one or more retransmissions over a sidelink. The UE may then transmit the initial transmission using the periodic resources and transmit the one or more retransmissions using the aperiodic resources. A receiving UE may receive the SCI indicating a set of resources for a sidelink transmission from a second wireless device, determine a first resource in the set of resources which is periodically reserved, and determine one or more remaining resources in the set of resources which is aperiodically reserved.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink reservation component 198. The sidelink reservation component 198 of a UE 104 transmitting the sidelink communication may be configured to transmit a sidelink control information (SCI) reserving periodic resources for an initial transmission and aperiodic resources for one or more retransmissions over a sidelink, transmit the initial transmission using the periodic resources, and transmit the one or more retransmissions using the aperiodic resources. The sidelink reservation component 198 of a UE 104 receiving or sensing the sidelink communication may be configured to receive the SCI indicating a set of resources for a sidelink transmission from a second wireless device, determine that the first set of resources includes a first resource that is periodically reserved and one or more remaining resources that are aperiodically reserved, and perform sensing or resource reservation based on the first resource as a periodic resource and the one or more remaining resources as aperiodic resources.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
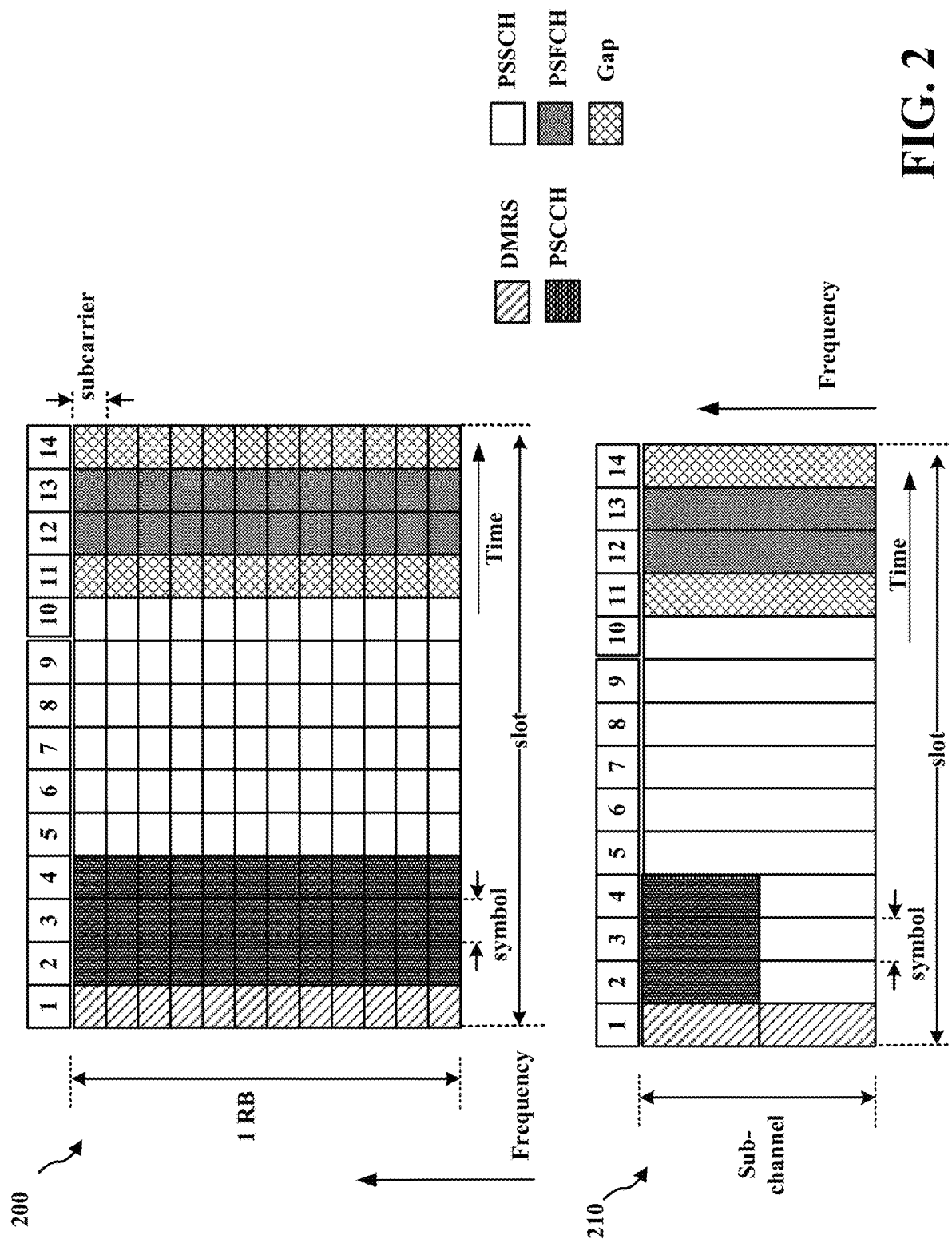
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
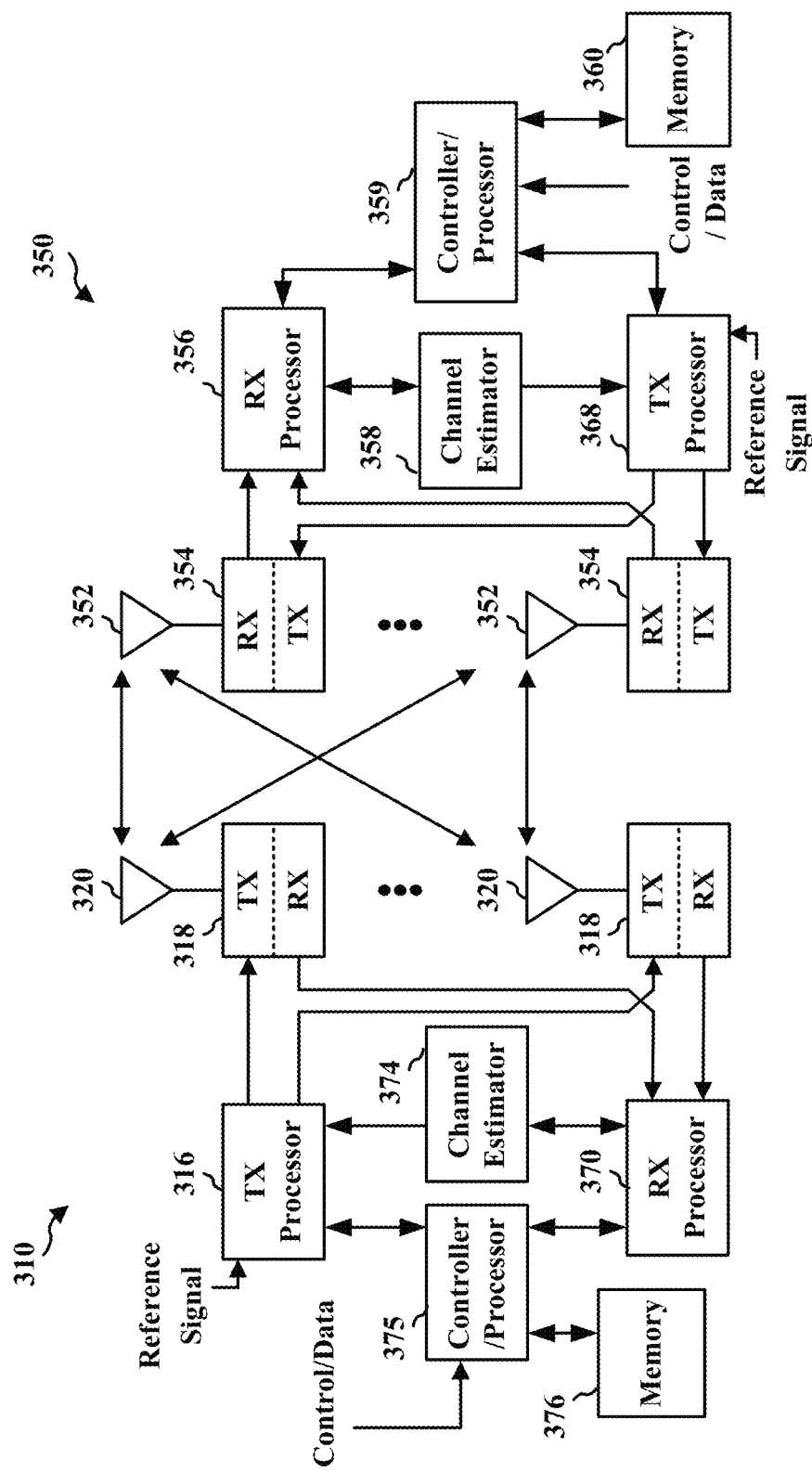
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink reservation component 198 of FIG. 1. At least one of the TX processor 316, the RX processor 370, and the controller/processor 375 may be configured to perform aspects in connection with the sidelink reservation component 198 of FIG. 1. The sidelink reservation component 198 of the UE 104 may be configured to reserve/allocate resources in a way that supports partial sensing or discontinuous reception for sidelink UEs. Although the following description may be focused on 5G NR, the concepts described herein may be applicable to other similar areas, such as LTE, LTE-A, CDMA, GSM, and other wireless technologies.

Figure 4:
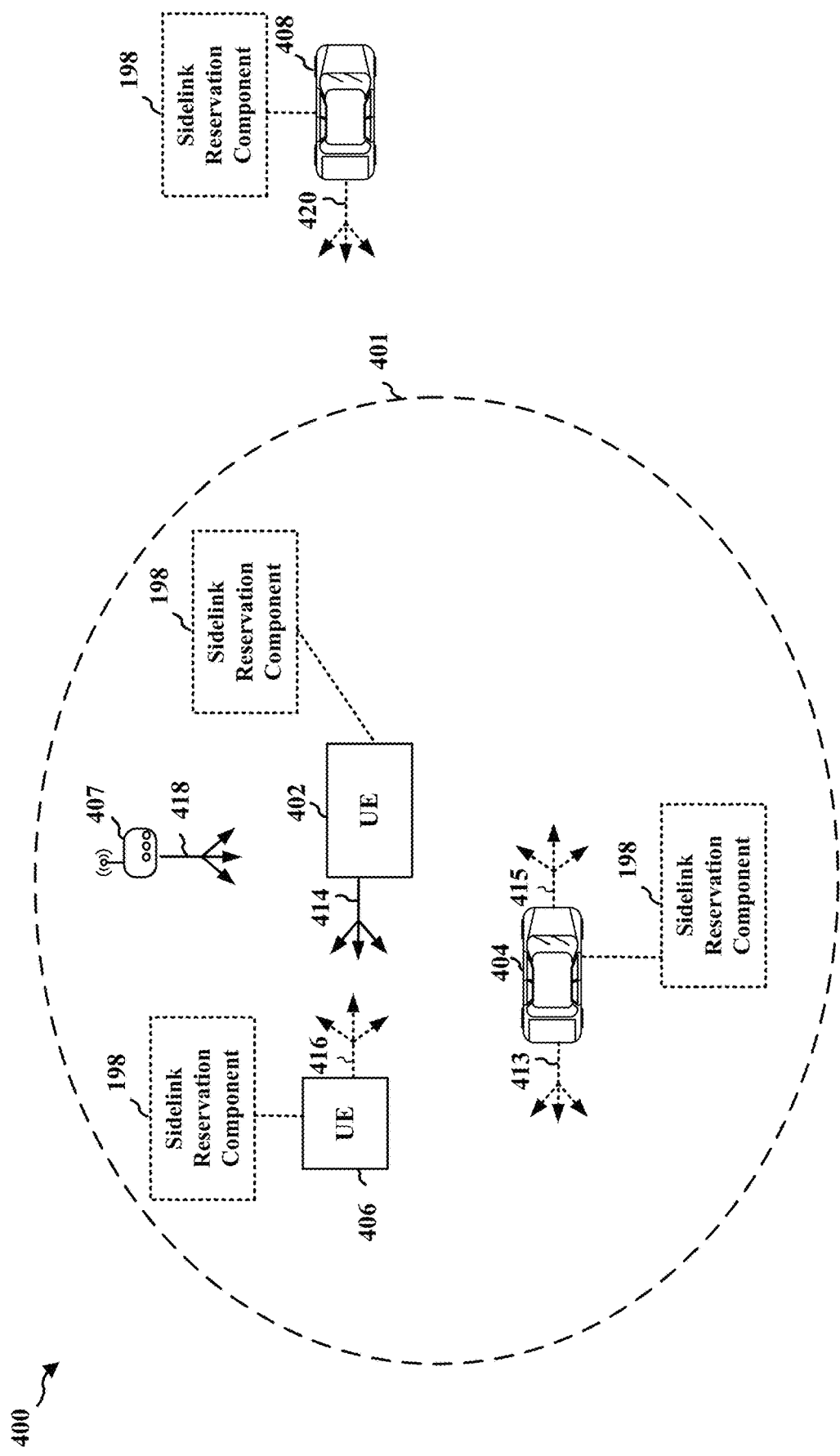
FIG. 4 illustrates an example of wireless communication between devices based on sidelink communication.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmission 416. Additionally or alternatively, RSU 407 may receive communication from and/or transmit communication 418 to UEs 402, 404, 406, 408. One or more of the UEs 402, 404, 406, or 408 or the RSU 407 may comprise a sidelink reservation component 198 as described in connection with FIG. 1.

For some UEs, such as vehicle UE (VUE), the UE may have access to larger amounts of battery power, and power savings may not be as important as other factors. For example, a VUE may continually sense sidelink resources, such as a pool of resources, to identify resources reserved by other UEs, receive the sidelink communication from the other UEs, or select the available resources for sidelink transmission. For other UEs, power savings and longer battery lives may be more significant.

As presented herein a UE 402, 404, 406, or 408 may reduce power consumption through DRX in which the UE 402, 404, 406, or 408 monitors for communication or transmits communication during a DRX ON duration and does not monitor for communication or transmit communication during a DRX OFF duration. For example, the UE may monitor for sidelink control information (SCI) discontinuously using a sleep and wake cycle. The DRX OFF duration may correspond to a time during which the UE operates in a lower power mode, a sleep mode, etc. During the DRX OFF duration, the UE may shut down, turn off, or not use a radio frequency (RF) function. The DRX pattern may include one or more timers and values, such as an on-duration timer, a value indicating the starting point of the DRX ON duration and/or the DRX OFF duration, etc. The ON duration timer may indicate a period of time, e.g., in consecutive symbols, slots, subframes, or TTIs, in which the UE wakes up from the OFF duration and monitors for control signaling. A DRX cycle may include a periodic repetition of the DRX ON duration and the DRX OFF duration.

By having periods during which the UE does not monitor for or transmit communication, the UE may save power or extend battery life for the UE. For example, DRX for sidelink may provide power savings, e.g., at a physical layer or a medium access control (MAC) layer. Power savings may be helpful in sidelink applications such as public safety applications, commercial applications, wearables, etc.

DRX may also be used by a UE for communication over a link 120, e.g., a cellular link, access link, or Uu link, between a UE 104 and a base station 102 or 180, as illustrated in FIG. 1. The base station 102 or 180 may configure the UE 104 with a DRX configuration. The base station may configure DRX parameters for the UE that indicate the DRX cycle, the DRX ON duration, etc. Additionally, the base station 102 or 180 may schedule the communication with the UE 104 based on the UE's DRX configuration because the base station is aware of the DRX configuration that the base station 102 or 180 provided to the UE 104.

Figure 5:
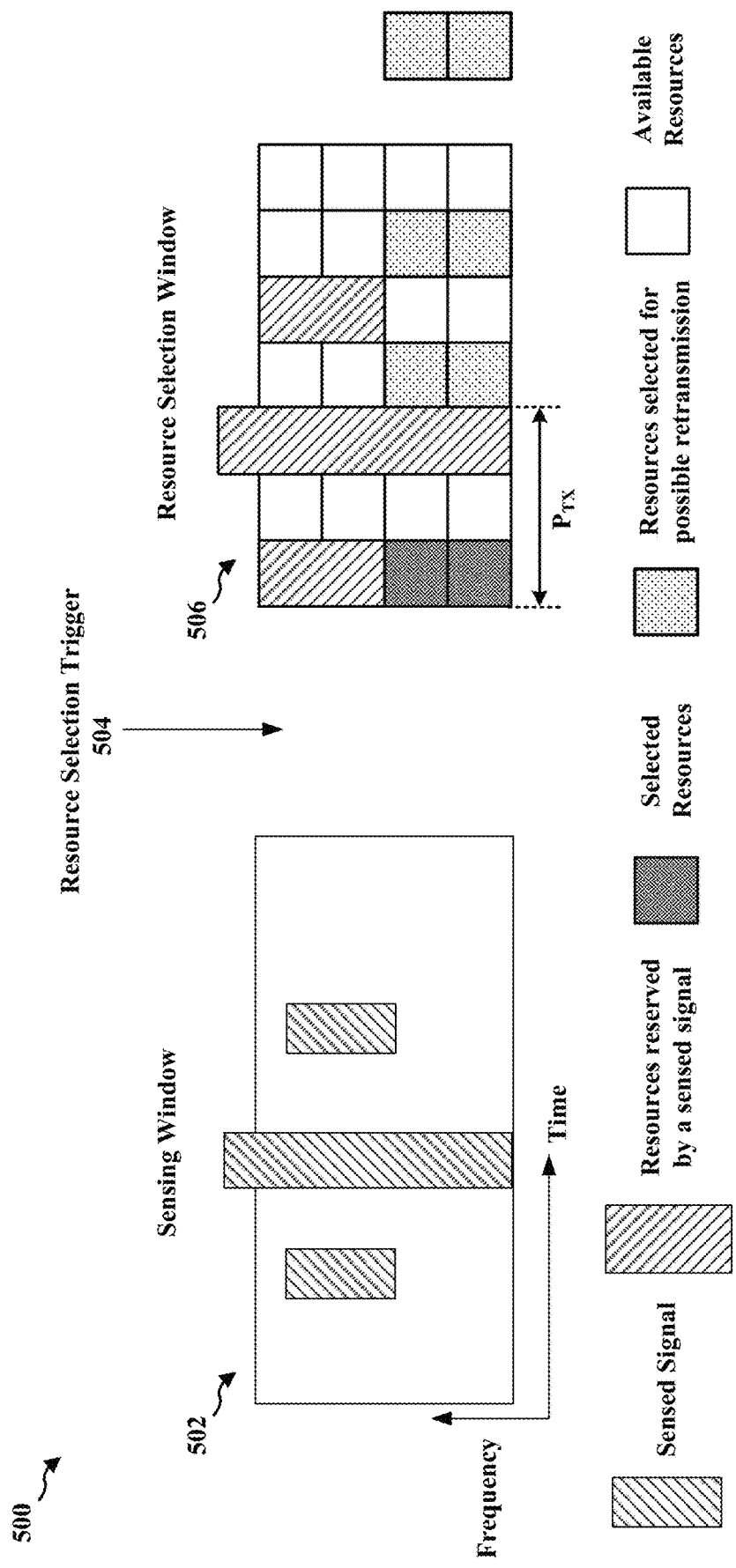
FIG. 5 illustrates example as of resource allocation for sidelink communication based on sensing.

FIG. 5 illustrates an example of DRX cycle 500 that may be configured by a base station 102 or 180 for a UE 104 using an access link 120 with the base station. The UE 104 may monitor for PDCCH from the base station 102 or 180 during the DRX ON duration and may skip monitoring for the PDCCH during the DRX OFF duration. If the UE receives a PDCCH during the ON duration, such as illustrated at 502, the UE may stay awake for an extended period of time-based on an inactivity timer that starts upon reception of the PDCCH. If the UE 104 does not receive downlink communication from the base station 102 or 180 during the duration of the inactivity timer, the UE may stop monitoring, e.g., enter a sleep mode or lower power mode, for the remaining DRX OFF duration.

The sidelink communication exchanged between devices may rely on discovery messages for sidelink UEs to find nearby UEs or rely on sensing resource reservations by other UEs to select resources for transmission. The sidelink communication may be based on different types or modes of resource allocation mechanisms. A first resource allocation mode (which may be referred to herein as "Mode 1") may provide a centralized resource allocation. For example, a base station 102 or 180 may determine resources for sidelink communication and/or allocate resources for different UEs 104 to use for sidelink transmissions. In this first mode, a sidelink UE receives the allocation of sidelink resources from the base station 102 or 180. A second resource allocation mode (which may be referred to herein as "Mode 2") may provide a distributed resource allocation. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources.

FIG. 5 illustrates an example of resource allocation based on sensing 500 in the Mode 2. The UE may perform sensing by monitoring for sidelink control information (SCI) indicating resources that the other UEs intend to use to transmit sidelink transmissions. The SCI indicating resources may be described as reserving the sidelink resources. The indicated resources may be referred to as a sidelink reservation. The UE may monitor a set of frequency resources over a window of time, as shown at 502 in FIG. 5. The frequency range may be based on a set of resources for sidelink communication. The time and frequency resources for sidelink communication may be referred to as a resource pool. The UE may determine the available resources in the resource pool based on the remaining resources that are not reserved. In some examples, the UE may reserve resources if a measured power of the resource for the corresponding SCI that is received in the sensing window meets a threshold, such as a reference signal received power (RSRP) threshold, a received signal strength indicator (RSSI) threshold, or other signal strength threshold. For example, the UE may reserve a resource that has a power measurement less than or equal to the RSRP threshold. In other words, by sensing the transmission in the past window of time (for example, 502), the UE may determine which resources are reserved or occupied by other UEs and select the resources in the resource pool available for transmission and not occupied by other transmissions.

After the occurrence of a resource selection trigger, at 504, the UE may select resources for transmission from the available resources in the resource pool. The resource selection may be triggered, for example, by the UE having a packet or a TB for transmission. FIG. 5 illustrates an example resource pool 506 and resources selected by the UE from the available resources that are not reserved by SCI received during the sensing window.

Figure 6:
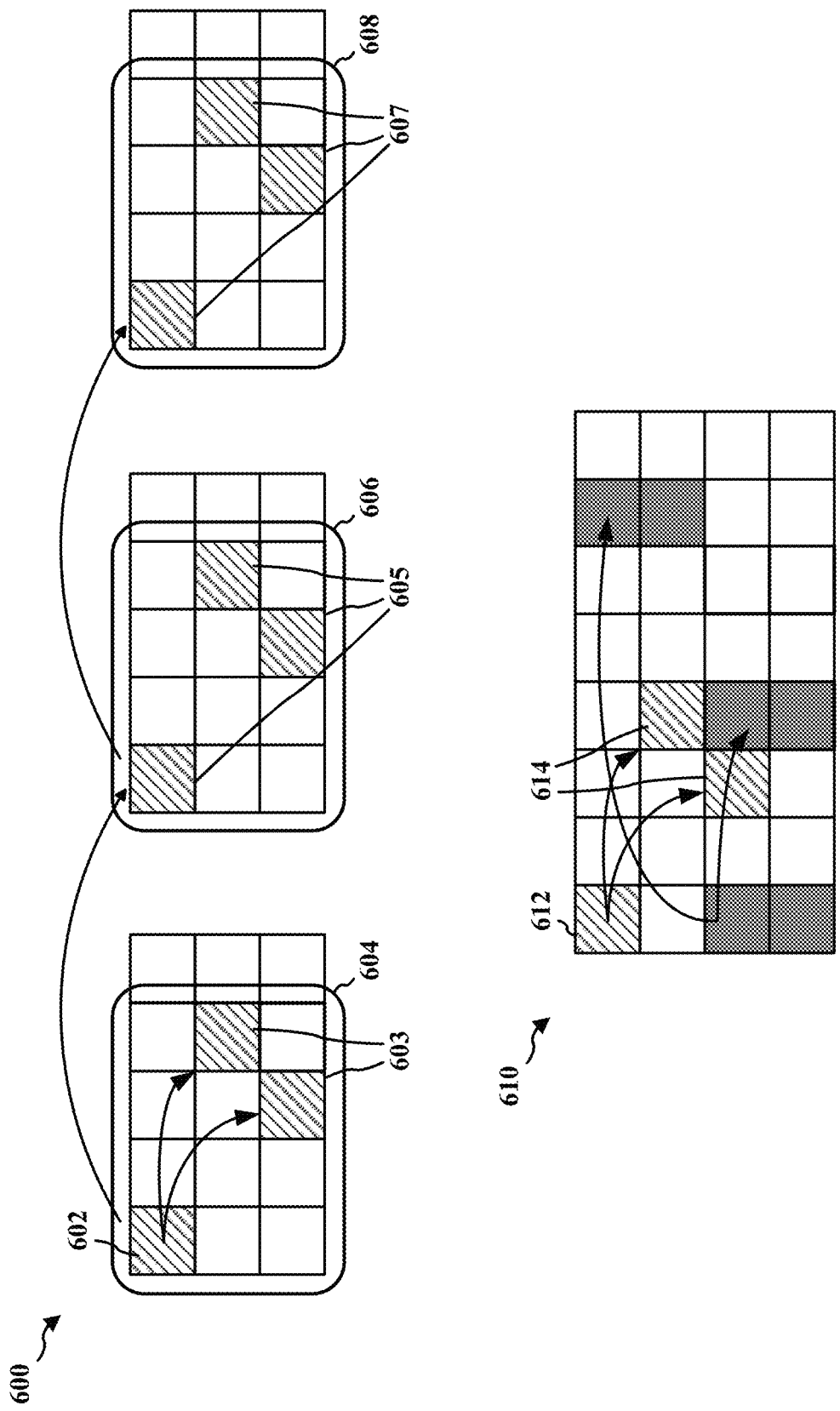
FIG. 6 illustrates example aspects of periodic and aperiodic resource reservations for sidelink resource allocation.

FIG. 6 illustrates an example aspect of a periodic resource reservation 600 and an example aspect of an aperiodic resource reservation 610 for sidelink resource allocation. The resource allocation may be reservation-based, e.g., on NR sidelink. A UE may transmit a reservation for a sidelink transmission that also reserves resources in the future period beyond a current period being scheduled, and the reserved resources will not be available for transmission of other UEs. The resource may be allocated in units of sub-channels in the frequency domain and may be limited to one slot in the time domain. A transmission from a UE may reserve resources in the current slot and up to two resources in the future slots. The resource reservation information may be carried in sidelink control information (SCI), and the resource reservations may be made in a window of 32 logical slots.

The resource reservation may include aperiodic and periodic resource reservations. In the periodic resource reservation, a UE may send an SCI indicating reservation of resources in the current slot as well as future slots periodically. For example, in the periodic resource reservation 600, the UE may send an SCI 602 indicating the reservation of resources 603 in the current slot 604, and the SCI 602 may also reserve a set of resources 605 and 607 in the future slots 606 and 608 periodically. The periodic reservation reserves the same resources in each time slot of the slots 604, 606, and 608. The periodicity of the periodic resource reservation may be configurable between 0 ms and 1000 ms and may be signaled in the SCI. The periodic resource reservation and signaling can be disabled by a configuration.

In the aperiodic resource reservation, the UE may send an SCI indicating reservation of resources for one-time use. That is, the aperiodic resource reservation may reserve the resources for the current slot only. For example, in the aperiodic resource reservation 610, the UE may send an SCI 612 at time n, indicating the reservation of resources 614 at time n+2 and n+3, the reservation is valid only for the current slot, and the reservation occurs only once. The aperiodic resource reservation within a slot may be limited to a certain number of resource reservations. For example, the number of aperiodic resource reservations within a slot may be limited to up to 2 resource reservations, which means that up to three resources may be indicated in an SCI 612 for the transmission of a packet or a TB.

Figure 7:
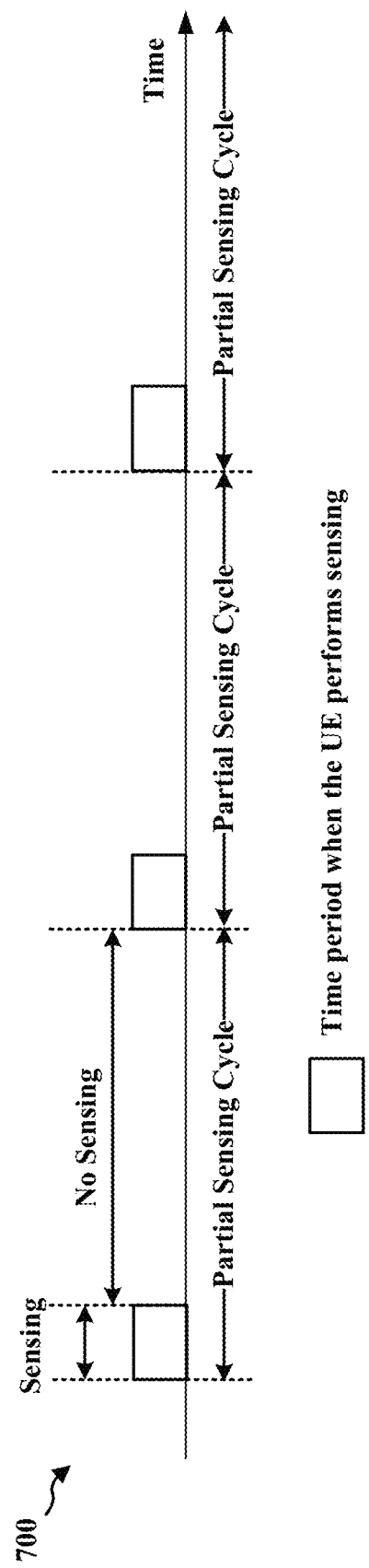
FIG. 7 illustrates example aspects of partial sensing for sidelink resource allocation.

In some examples, the UE may continually sense for reservations from other UEs. In other examples, the UE may perform sensing in a discontinuous manner, which may be referred to as partial sensing. FIG. 7 illustrates an example of partial sensing 700 in which the UE performs sensing in a discontinuous manner. The UE may use an ON/OFF pattern in which the UE periodically performs sensing for resource allocation purposes, e.g., during a sensing period, and at other times, e.g., during a non-sensing duration of time, does not monitor for sidelink reservation signals. For example, the UE may perform sensing only during the ON period and may skip sensing during an OFF period.

A UE operating using DRX and/or partial sensing for sidelink will miss SCI from other UEs reserving resources and/or attempting to communicate with the UE during the DRX and/or partial sensing OFF duration. Referring back to FIG. 5, The UE that continuously senses for reservations from other UEs may keep track of all the resource reservations from other UEs and know which resources are available for resource reservation and transmissions. The UE that is operating in the DRX and/or partial sensing for sidelink may know the resource reserved by the other UEs during the last DRX and/or partial sensing ON period and may not know which resources had been additionally reserved by other UEs during the DRX and/or partial sensing OFF period.

Figure 8:
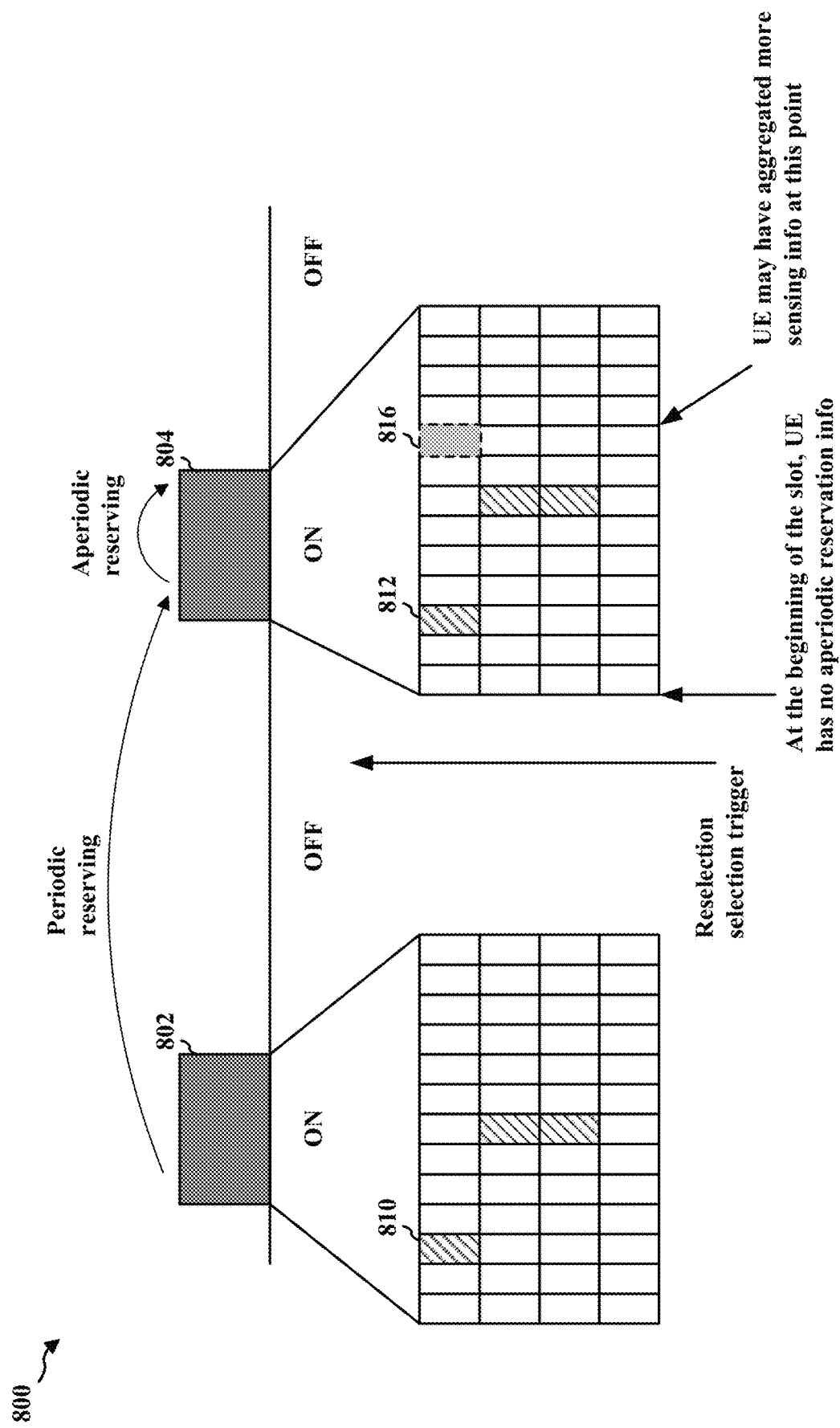
FIG. 8 illustrates example aspects of partial sensing for sidelink resource allocation.

FIG. 8 illustrates example aspects of partial sensing for sidelink resource allocation. FIG. 8 illustrates an example of partial sensing 800 including periodic sensing time periods separated by periods during which the UE does not perform sensing. The UE in DRX partial sensing mode may sense for the reservations from the other UEs during the DRX ON periods 802 and 804 and may not sense for the reservations from the other UEs during the DRX OFF periods between the DRX ON periods 802 and 804. Accordingly, the UE may know of the periodic resource reservations within the DRX ON period 804 that correspond to the periodic resource reservations within the DRX ON period 802. For example, the UE may know that the resource 812 is reserved by a second UE with a period of 10 ms within the DRX ON period 804 if the resource 812 corresponds with the resource 810 that was periodically reserved by the second UE during the previous DRX ON period 802. However, if a third UE transmits, during the DRX OFF between the DRX ON periods 802 and 804, an SCI indicating a resource reservation reserving the resource 816 during the DRX ON period 804, the UE may not be aware of the reservation of the resource 816 by the third UE.

In some aspects, the periodic resource reservation may occur over a longer period of time, and aperiodic resource reservation may occur at a shorter time. Therefore, the aperiodic reservation information that occurred during the DRX OFF period between the DRX ON periods 802 and 804 at the beginning of the slot may not be available for the UE that wakes up and enters the DRX ON period 804. Based on the examples of the current disclosure, the UE may enter the DRX ON period 804, listen to the transmissions from the other UEs, and gradually aggregate sensing information from the aperiodic resource reservations from the other UEs. Accordingly, if the UE may determine the resource for reservations after the UE has aggregated a certain amount of sensing information, the UE may have an improved chance of avoiding signaling collision with the other UEs, and communicating with the other UEs may be better coordinated.

Figure 9:
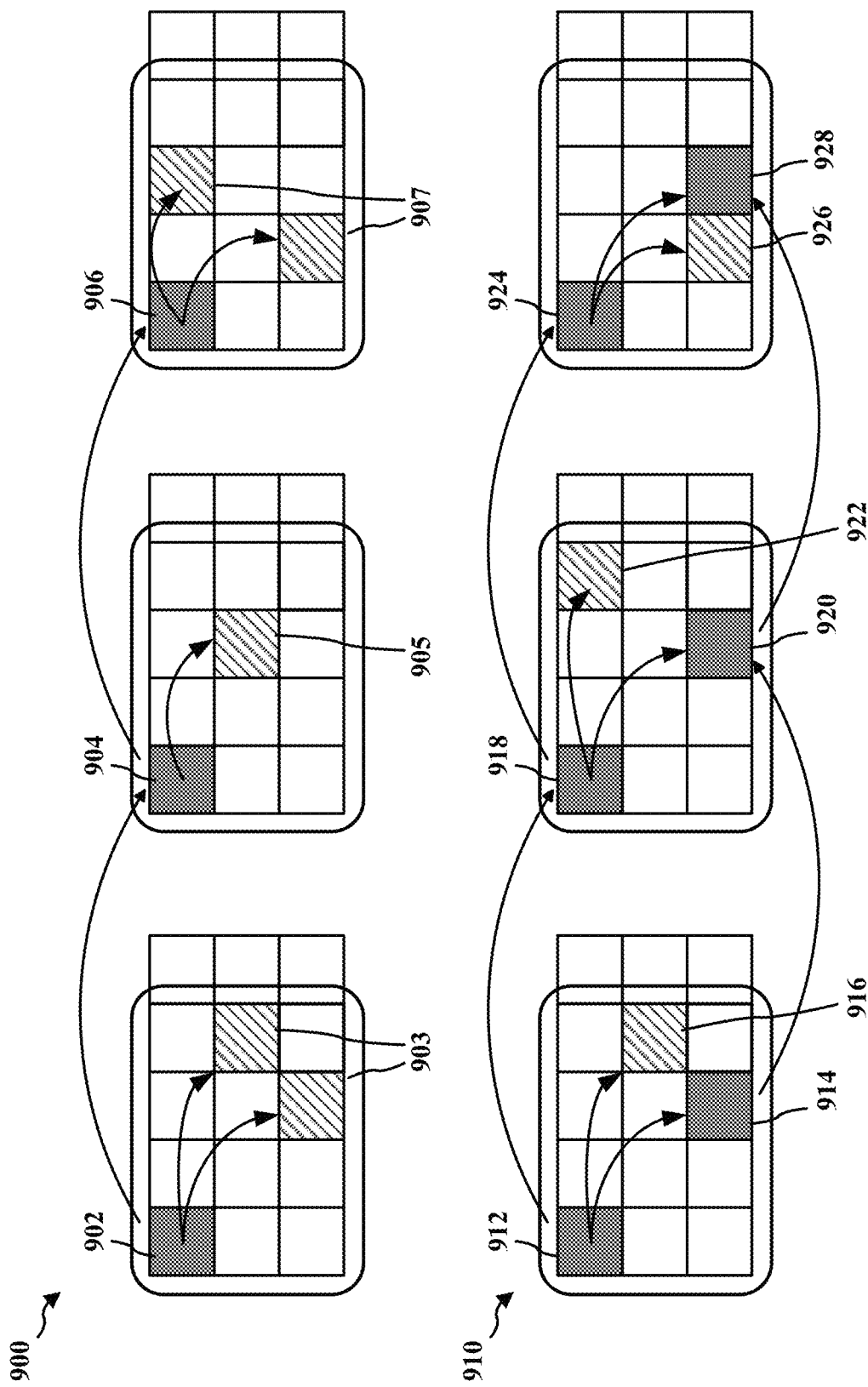
FIG. 9 illustrates example aspects of sidelink resource allocation for partial sensing.

FIGS. 8 and 9 illustrate the resource allocation of the partial sensing for the DRX sidelink that uses the DRX on/off pattern. However, the examples of the current disclosure are not necessarily limited thereto. In another aspect, the ON/OFF pattern is illustrated in FIGS. 8 and 9 may be any type of ON/OFF pattern, such as partial sensing ON/OFF pattern or any form of sidelink activity ON/OFF pattern.

FIG. 9 illustrates example aspects 900 and 910 of sidelink resource allocation for partial sensing. In one aspect, a UE may use the periodically reserved resources to transmit the initial transmission of a packet/TB and use the aperiodically reserved resources to perform retransmissions of the packet/TB within the period. That is, the UE may transmit the SCI reserving the periodic resources and the aperiodic resources, and transmit the initial transmission using the periodic resources and transmit the retransmissions using the aperiodic resources.

In the aspects of the disclosure, one sidelink grant may contain two types of resources, periodic resources and aperiodic resources. Accordingly, all resources indicated in the same grant are not limited to the same periodicity property, and one SCI may indicate both the periodic resource reservation and the aperiodic resource reservation. That is, not all of the resource reservations indicated in one SCI need to be periodically reserved resources, nor all of the resource reservations in one SCI need to be aperiodic resources.

In one example aspect 900, the first resource indicated by the grant may be periodic resources with the periodicity indicated by the period field in the sidelink grant, and all the other resources indicated by the grant may be aperiodic resources that are applied in the current period or slot. In other words, from another UE's (i.e., the sensing UE) perspective, the sensing UE may decode, from one SCI, a grant that contains up to 3 resource allocations and the periodicity of the resource reservation. The sensing UE may determine that the first resource indicated in the grant may be periodically reserved in the future period, and the other resources indicated in a grant may only occur aperiodically (e.g., occur only once) in the current period.

For example, the grant received in the resource 902 may indicate a reservation for three resources, 902 and 903. The sensing UE may decode the SCI and determine that the first allocated resource 902 may be reserved as the periodic resource, and the second and third allocated resources 903 may be reserved as the aperiodic resources. The grant received in the resource 904 may indicate a reservation for three resources, 904 and 905. The sensing UE may decode the SCI and determine that the first allocated resource 904 may be reserved as the periodic resource, and the second allocated resource 903 may be reserved as the aperiodic resource. The grant received in the resource 906 may indicate a reservation for three resources, 906 and 907. The sensing UE may decode the SCI and determine that the first allocated resource 906 may be reserved as the periodic resource, and the second and third allocated resources 907 may be reserved as the aperiodic resources.

The example illustrates that the first allocated resource is periodically reserved, and the second and third allocated resources are aperiodically reserved, but the examples of the current disclosure are not necessarily limited thereto, and the first two indicated resources may be the periodic resources, and the last indicated resource may be the aperiodic resources.

In another example aspect 910, instead of fixing the first or the first two resources as periodic resources and the remaining resources as aperiodic resources, the sidelink UE may dynamically indicate in the SCI whether an indicated or reserved resource in the period is the periodic resource or the aperiodic resource. For example, for all or a subset of resources indicated in the SCI, the sidelink transmission UE may additionally indicate whether a resource of the subset of resources is a periodic resource or an aperiodic resource. For example, the UE may indicate for each of the two reserved resources whether they are periodic (indicate a bit 1) or aperiodic (indicate a bit 0). The UE may include some additional bits in the SCI to indicate whether the allocated resource(s) is the periodic resource or the aperiodic resource. For example, the UE may not need to indicate the first resource in the grant and treat the first resource in the grant as the periodic resource. The additional bits may be included in SCI-1 (i.e., the first SCI in a two-stage SCI).

For example, the grant received in the resource 912 may indicate a first resource 912, a second resource 914, and a third resource 916. The sensing UE may decode the SCI and determine that the first resource 912 allocated or reserved by the SCI is the periodic resource. The sensing UE may further decode the SCI indicating a bit 1 for the second resource 914 and a bit 0 for the third resource 916, and determine that the second resource 914 is the periodic resource, and the third resource 916 is the aperiodic resource. In a similar manner, the SCI grant received in the resource 918 may indicate a first resource 918, a second resource 920, and a third resource 922, and indicate a bit 1 for the second resource 920 and the third resource 922. The sensing UE may decode the SCI and determine that the first resource 918 and the second resource 920 are the periodic resources and that the third resource 922 is the aperiodic resource. Finally, the SCI received in the resource 924 may include the grant that may indicate a first resource 924, a second resource 926, and a third resource 928, and indicate a bit 0 for the second resource 926 and a bit 1 for the third resource 928. The sensing UE may decode the SCI and determine that the first resource 924 and the third resource 928 are the periodic resources and that the second resource 926 is the aperiodic resource.

In one aspect of the disclosure, when allocating the periodic resources and the aperiodic resources, the UE may select the periodic resources for the initial transmission based on a first sensing threshold and select the aperiodic resources within a period for the one or more retransmissions based on a second sensing threshold. For example, the first sensing threshold may include an RSRP threshold, and the second sensing threshold may include a second RSRP threshold.

According to the current disclosure of the sidelink resource allocation, the loss of packet/reservation due to the half-duplex of the partial sensing may be reduced.

Figure 10:
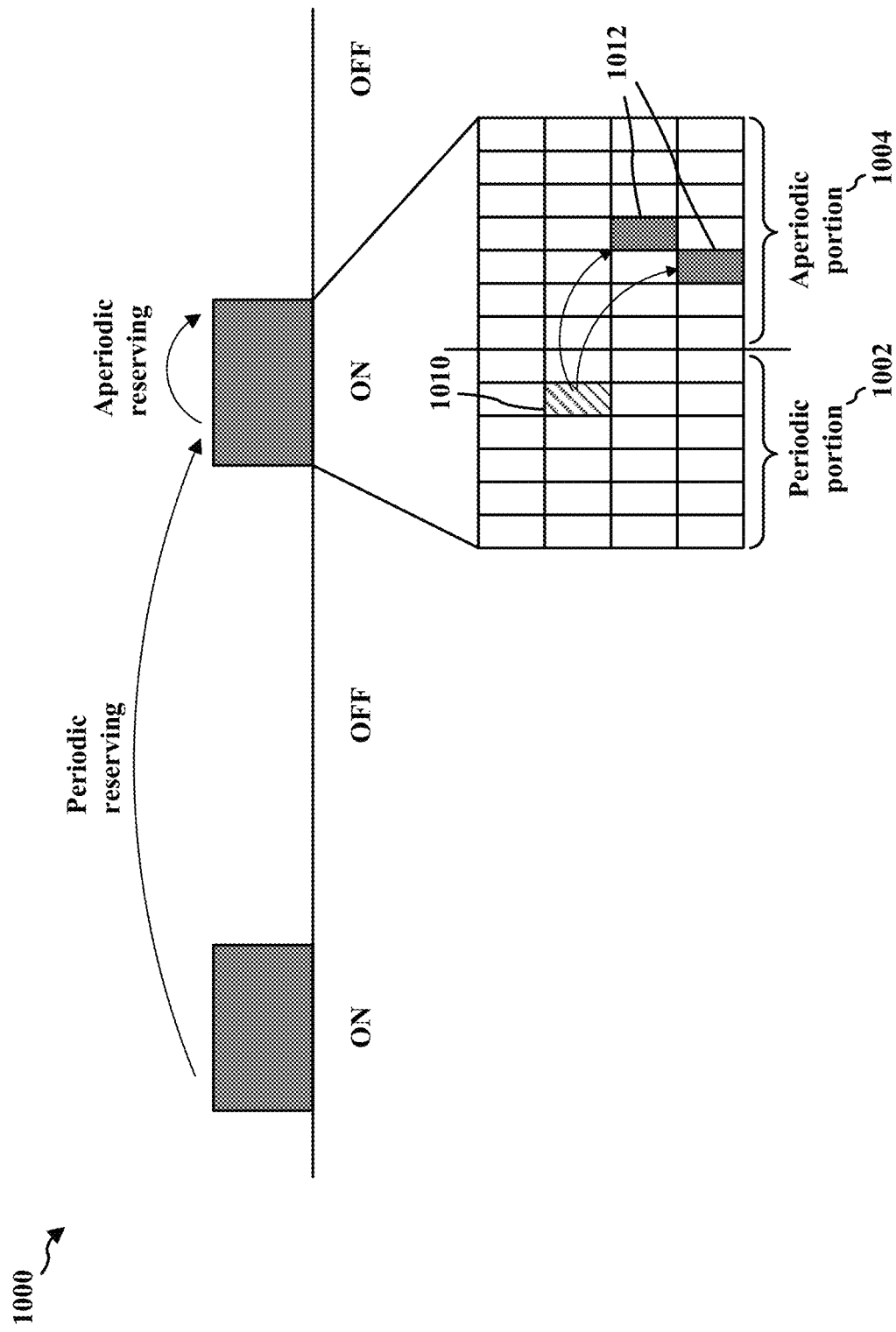
FIG. 10 illustrates example aspects of sidelink resource allocation for partial sensing.

FIG. 10 illustrates example aspects of sidelink resource allocation 1000 for partial sensing. In one aspect, a UE may partition the sidelink active window into two portions, reserve the periodic resources in a first portion 1002 of the sidelink active window (or a periodic part), and reserve the aperiodic resources in a second portion 1004 of the sidelink active window (or an aperiodic part). The sidelink UE without data to transmit/receive in the current period may sense the periodic resource portion of the sidelink activity window and may not sense the aperiodic portion of the sidelink activity window since the aperiodic resource reservation may not go beyond the current sidelink activity window. According to the current aspect of the disclosure, the periodic portion of the resources may be effectively utilized based on past reservations, further reducing the chance of collision with the first portion of the sidelink active window. As a result, all the aperiodic reservations may go through as well.

At the start of the second portion 1004 of the sidelink active window, UE may have sufficient information about the reservation information on the second portion 1004 of the sidelink activity window based on the sensing within the first portion 1002 of the sidelink active window. Therefore, the sidelink UE may properly select the aperiodic resource accordingly. For example, a sensing UE may sense the first portion 1002 of the sidelink active window and detect that a grant received in a first resource 1010 reserves one periodic resource 1010 and two aperiodic resources 1012, and the sensing UE may select the resources in the second portion 1004 other than the two aperiodic resources 1012 based on the sensing performed within the first portion 1002.

In one aspect of the disclosure, the UE may receive a configuration indicating the first portion and the second portion of the sidelink active window. The configuration indicating the first portion and the second portion of the sidelink active window may be received from a base station. In another aspect of the disclosure, the configuration indicating the first portion and the second portion of the sidelink active window may be configured at the UE.

In one aspect of the disclosure, when allocating the periodic resources and the aperiodic resources, the UE may select the periodic resources based on a first sensing threshold for the initial transmission and select the aperiodic resources based on a second sensing threshold within a period for the one or more retransmissions. For example, the first sensing threshold may include a first reference signal received power (RSRP) threshold, and the second sensing threshold may include a second RSRP threshold.

Figure 11:
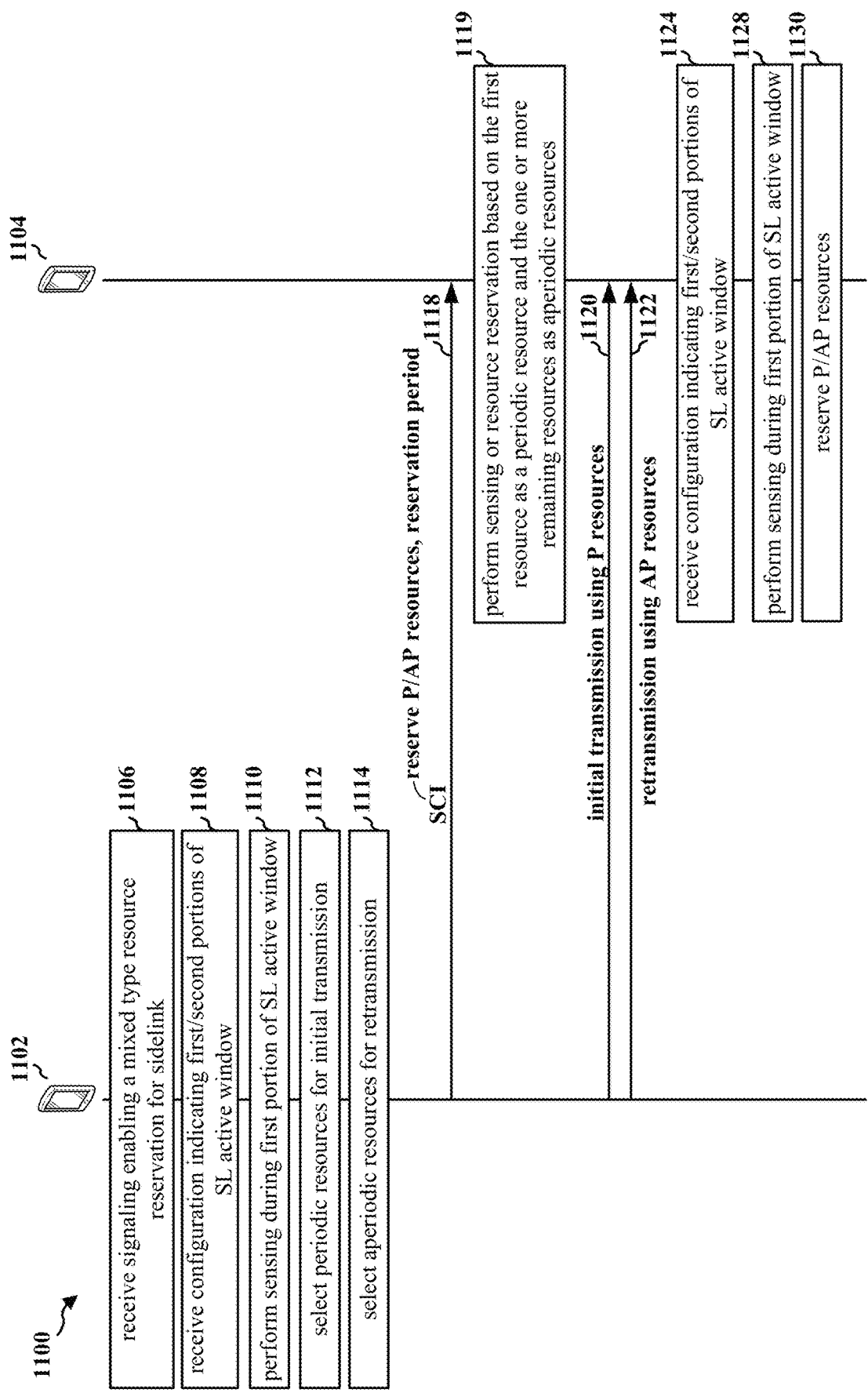
FIG. 11 is a call-flow diagram of wireless communication.

FIG. 11 is a call-flow diagram 1100 of wireless communication. The wireless communication may be a sidelink communication, including a transmitting UE 1102 and a sensing UE 1104. The transmitting UE 1102 may transmit SCI that indicates periodic resources reserved for an initial transmission and aperiodic resources for one or more retransmissions over the sidelink communication, and transmit the initial transmission on the periodic resources and the one or more transmissions on the aperiodic resources. The sensing UE 1104 may receive the SCI and determine the periodic resources and the aperiodic resources, perform sensing during a portion of the sidelink active window, and determine the reserved periodic resources and the reserved aperiodic resources.

At 1106, the transmitting UE 1102 may receive signaling enabling a mixed type resource reservation for the sidelink communication. The transmitting UE 1102 may transmit the mixed type resource reservation in the SCI at 1118 based on receiving the signaling enabling the mixed type resource reservation for sidelink communication.

At 1108, the transmitting UE 1102 may receive a configuration indicating a first portion and a second portion of a sidelink active window. Here, the first portion of the sidelink active window may be referred to as a periodic part, and the second portion of the sidelink active window may be referred to as an aperiodic part. In one aspect, the configuration indicating the first portion and the second portion of the sidelink active window may be received from a base station. In another aspect, the first portion and the second portion of the sidelink active window may be configured at the transmitting UE 1102.

At 1110, the transmitting UE 1102 may perform a sensing during the first portion of the sidelink active window. Based on the sensing performed within the first portion of the sidelink active window, the transmitting UE 1102 may determine which resources in the second portion of the sidelink active window are reserved by other UEs and unavailable for the transmitting UE 1102, and may select the resources that are available in the second portion of the sidelink active window for the transmitting UE 1102 to reserve the aperiodic resources for retransmission.

At 1112, the transmitting UE 1102 may select the periodic resources for the initial transmission. The transmitting UE 1102 may reserve the periodic resources in the first portion of the sidelink active window (or the periodic part), and schedule the initial transmission in the periodic resource. The transmitting UE 1102 may use a first sensing threshold to select the periodic resources, and the first sensing threshold may be a first RSRP threshold.

At 1114, the transmitting UE 1102 may select the aperiodic resources for the retransmission. The transmitting UE 1102 may reserve the aperiodic resources in the first portion of the sidelink active window (or the periodic part), and schedule the retransmission in the aperiodic resources. The transmitting UE 1102 may use a second sensing threshold to select the periodic resources, and the second sensing threshold may be a second RSRP threshold.

At 1118, the transmitting UE 1102 may transmit SCI reserving periodic resources for an initial transmission and aperiodic resources for one or more retransmissions over a sidelink. The sensing UE 1104 may receive the SCI indicating the set of resources for the sidelink transmission from the transmitting UE 1102. The SCI may further indicate a mixed type resources reservation including periodic resources and aperiodic resources, and/or a resource reservation period. The periodic resources in the set of resources occur in multiple periods and aperiodic resources in the set of resources occur within the indicated period. The SCI may include a two-stage SCI, and for each sidelink resource reserved in the SCI, a first stage of the SCI may include the indication whether the sidelink resource is a periodic type or an aperiodic type.

At 1120, the transmitting UE 1102 may transmit the initial transmission using the periodic resources. The periodic resources may be determined based on the SCI transmitted from the transmitting UE 1102 and received by the sensing UE 1104 at 1118.

At 1122, the transmitting UE 1102 may transmit the one or more retransmissions using the aperiodic resources. The aperiodic resources may be determined based on the SCI transmitted from the transmitting UE 1102 and received by the sensing UE 1104 at 1118. The initial transmission and the one or more retransmissions may be for a same packet or a same transport block.

At 1119, the sensing UE 1104 may perform sensing or resource reservation based on the first resource as a periodic resource and the one or more remaining resources as aperiodic resources.

In some aspects, the SCI may indicate that the transmitting UE 1102 transmits the initial transmission and the one or more retransmissions to the sensing UE 1104. Based on the SCI indicating that the receiving UE 1104 is the intended receiver of the SCI, the sensing UE 1104 may receive the initial transmission and the one or more retransmissions from the transmitting UE 1102.

At 1120, the sensing UE 1104 may receive the initial transmission using the periodic resources. The periodic resources may be determined based on the SCI transmitted from the transmitting UE 1102 and received by the sensing UE 1104 at 1118.

At 1122, the sensing UE 1104 may receive the one or more retransmissions using the aperiodic resources. The aperiodic resources may be determined based on the SCI transmitted from the transmitting UE 1102 and received by the sensing UE 1104 at 1118. The initial transmission and the one or more retransmissions may be for a same packet or a same transport block.

At 1124, the sensing UE 1104 may receive configuration indicating the first portion and the second portion of sidelink active window. The configuration indicating the first portion and the second portion of the sidelink active window may be received from a base station. The configuration indicating the first portion may be relayed through the transmitting UE 1102 via the sidelink communication. Also, the first portion and the second portion of the sidelink active window may be configured at the sensing UE 1104.

At 1128, the sensing UE 1104 may perform sensing during the first portion of the sidelink active window. Based on the sensing performed within the first portion of the sidelink active window, the sensing UE 1104 may determine which resources in the second portion of the sidelink active window are reserved by the transmitting UE 1102 and the other UEs, and may properly identify the resources in the second portion of the sidelink active window that are available in the second portion of the sidelink active window as the aperiodic resources for retransmission.

At 1130, the sensing UE 1104 may reserve the periodic resources based on a first sensing threshold and the aperiodic resources based on a second sensing threshold The sensing UE 1104 may use a first sensing threshold to determine the periodic resources. The first sensing threshold may be a first RSRP threshold. The sensing UE 1104 may use a second threshold to determine the aperiodic resources. The second sensing threshold may be a second RSRP threshold.

Figure 12:
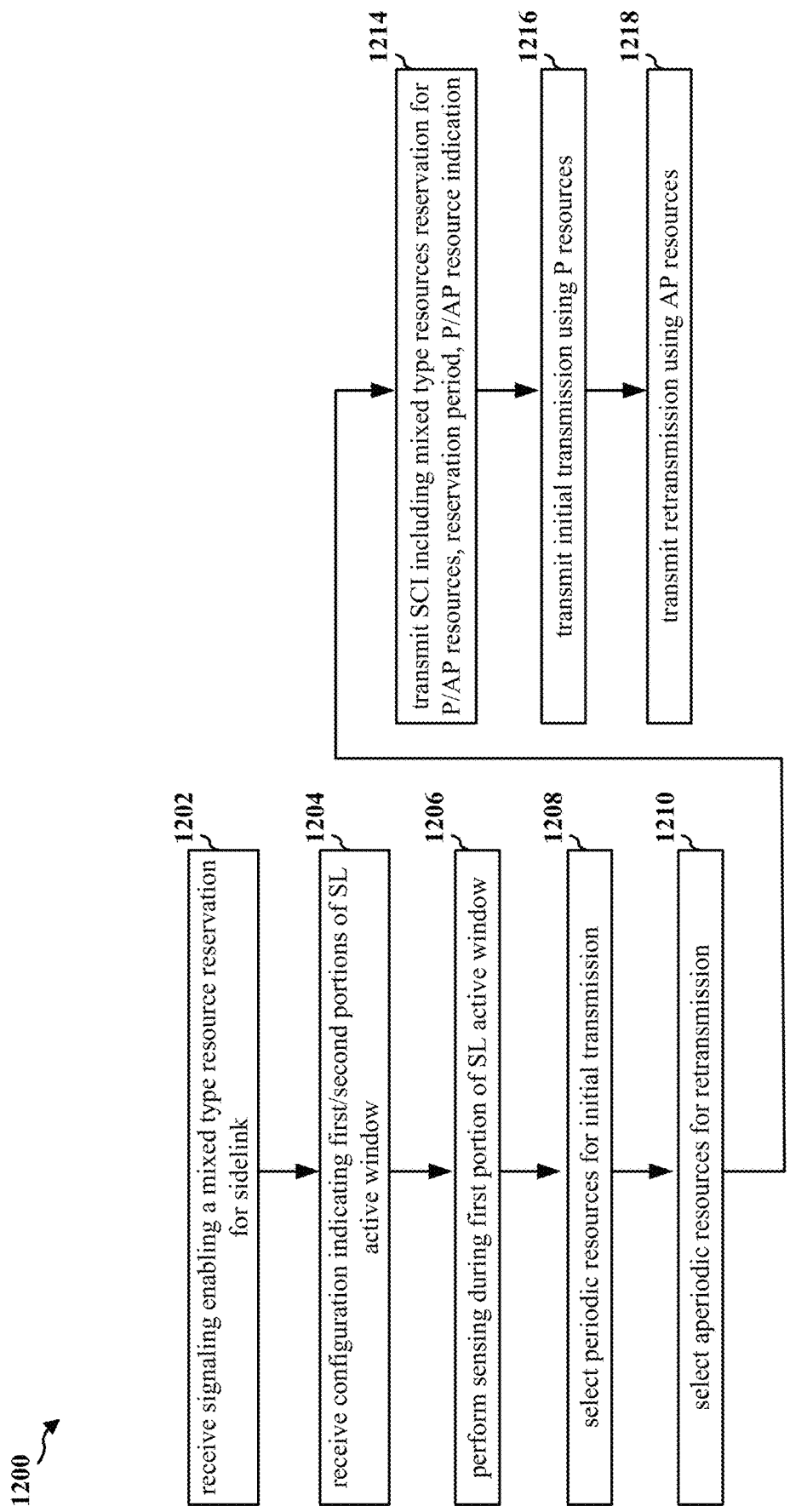
FIG. 12 is a flowchart of a method of wireless communication.

FIG. 12 is a flowchart 1200 of a method of wireless communication. The method may be performed by a transmitting UE (e.g., the transmitting UE 1102; the apparatus 1602). The UE may transmit SCI that indicates periodic resources reserved for an initial transmission and aperiodic resources for one or more retransmissions over the sidelink communication, and transmit the initial transmission on the periodic resources and the one or more transmissions on the aperiodic resources.

At 1202, the UE may receive signaling enabling a mixed type resource reservation for the sidelink communication. The UE may transmit the mixed type resource reservation in an SCI at 1214 based on receiving the signaling enabling the mixed type resource reservation for sidelink communication. For example, at 1106, the transmitting UE 1102 may receive signaling enabling a mixed type resource reservation for the sidelink communication. Also, 1202 may be performed by a mixed type resource reservation component 1640.

At 1204, the UE may receive a configuration indicating a first portion and a second portion of a sidelink active window. Here, the first portion of the sidelink active window may be referred to as a periodic part, and the second portion of the sidelink active window may be referred to as an aperiodic part. In one aspect, the configuration indicating the first portion and the second portion of the sidelink active window may be received from a base station. In another aspect, the first portion and the second portion of the sidelink active window may be configured at the UE. For example, at 1108, the transmitting UE 1102 may receive a configuration indicating a first portion and a second portion of a sidelink active window. Also, 1204 may be performed by the mixed type resource reservation component 1640.

At 1206, the UE may perform a sensing during the first portion of the sidelink active window. Based on the sensing performed within the first portion of the sidelink active window, the UE may determine which resources in the second portion of the sidelink active window are reserved by other UEs and unavailable for the UE, and may select the resources that are available in the second portion of the sidelink active window for the UE to reserve the aperiodic resources for retransmission. For example, at 1110, the transmitting UE 1102 may perform a sensing during the first portion of the sidelink active window. Also, 1206 may be performed by a sensing component 1642.

At 1208, the UE may select the periodic resources for the initial transmission. The UE may reserve the periodic resources in the first portion of the sidelink active window (or the periodic part), and schedule the initial transmission in the periodic resource. The UE may use a first sensing threshold to select the periodic resources, and the first sensing threshold may be a first RSRP threshold. For example, at 1112, the transmitting UE 1102 may select the periodic resources for the initial transmission. Also, 1208 may be performed by the mixed type resource reservation component 1640.

At 1210, the UE may select the aperiodic resources for the retransmission. The UE may reserve the aperiodic resources in the first portion of the sidelink active window (or the periodic part), and schedule the retransmission in the aperiodic resources. The UE may use a second sensing threshold to select the periodic resources, and the second sensing threshold may be a second RSRP threshold. For example, at 1114, the transmitting UE 1102 may select the aperiodic resources for the retransmission. Also, 1210 may be performed by the mixed type resource reservation component 1640.

At 1214, the UE may transmit the SCI reserving periodic resources for an initial transmission and aperiodic resources for one or more retransmissions over a sidelink. The SCI may further indicate a mixed type resource reservation for periodic and aperiodic resources, and the resource reservation period, wherein periodic resources in the set of resources occur in multiple periods and aperiodic resources in the set of resources occur within the indicated period. The SCI may include a two stage SCI, and for each sidelink resource reserved in the SCI, the first stage of the SCI may include the indication of whether a corresponding sidelink resource is the periodic type or the aperiodic type. For example, at 1118, the transmitting UE 1102 may transmit SCI reserving periodic resources for an initial transmission and aperiodic resources for one or more retransmissions over a sidelink. Also, 1214 may be performed by a data communication component 1644.

At 1216, the UE may transmit the initial transmission using the periodic resources. The periodic resources may be determined based on the SCI transmitted from the UE at 1214. For example, at 1120, the transmitting UE 1102 may transmit the initial transmission using the periodic resources. Also, 1216 may be performed by the data communication component 1644.

At 1218, the UE may transmit the one or more retransmissions using the aperiodic resources. The periodic resources may be determined based on the SCI transmitted from the UE at 1214. The aperiodic resources may be determined based on the SCI transmitted from the UE at 1214. The initial transmission and the one or more retransmissions may be for a same packet or a same transport block. For example, at 1122, the transmitting UE 1102 may transmit the one or more retransmissions using the aperiodic resources. Also, 1218 may be performed by the data communication component 1644.

Figure 13:
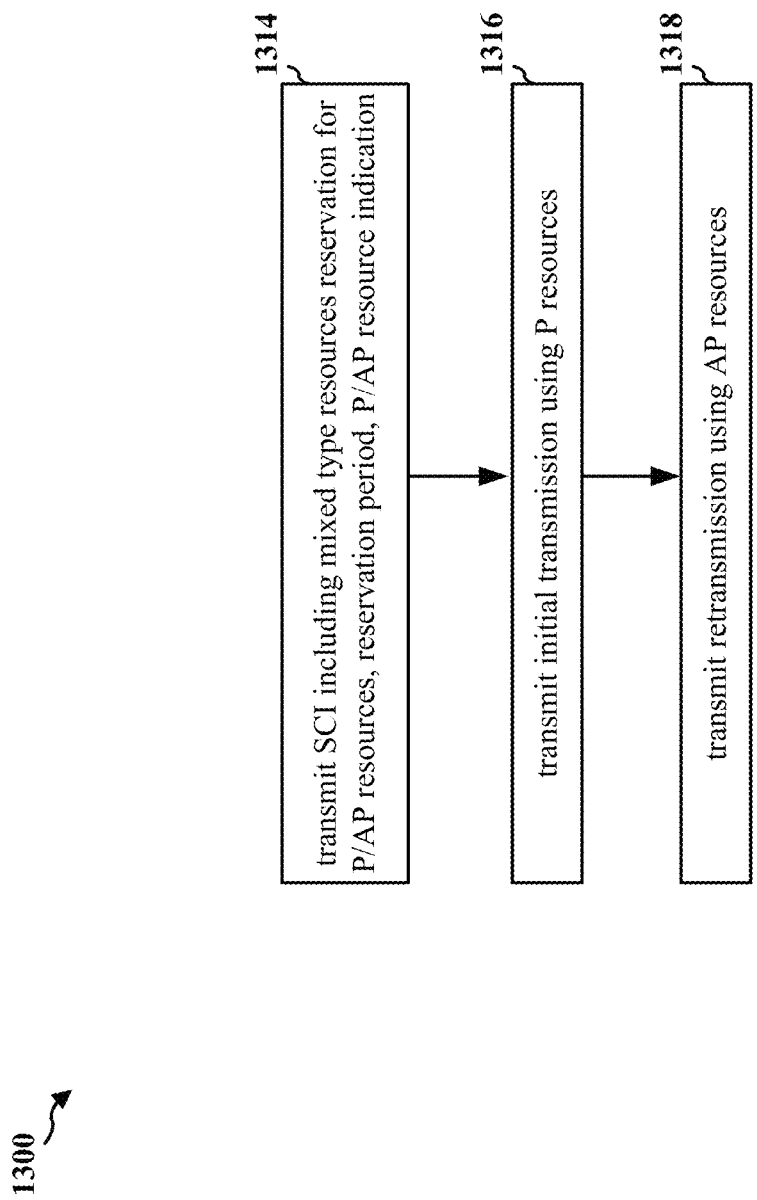
FIG. 13 is a flowchart of a method of wireless communication.

FIG. 13 is a flow chart 1300 of a method of wireless communication. The method may be performed by a transmitting UE (e.g., the transmitting UE 1102; the apparatus 1602). The UE may transmit SCI that indicates periodic resources reserved for an initial transmission and aperiodic resources for one or more retransmissions over the sidelink communication, and transmit the initial transmission on the periodic resources and the one or more transmissions on the aperiodic resources.

At 1314, the UE may transmit the SCI reserving periodic resources for an initial transmission and aperiodic resources for one or more retransmissions over a sidelink. The SCI may further indicate a mixed type resource reservation for periodic and aperiodic resources, and the resource reservation period, wherein periodic resources in the set of resources occur in multiple periods and aperiodic resources in the set of resources occur within the indicated period. The SCI may include a two stage SCI, and for each sidelink resource reserved in the SCI, the first stage of the SCI may include the indication of whether a corresponding sidelink resource is the periodic type or the aperiodic type. For example, at 1118, the transmitting UE 1102 may transmit SCI reserving periodic resources for an initial transmission and aperiodic resources for one or more retransmissions over a sidelink. Also, 1314 may be performed by a data communication component 1644.

At 1316, the UE may transmit the initial transmission using the periodic resources. The periodic resources may be determined based on the SCI transmitted from the UE at 1314. For example, at 1120, the transmitting UE 1102 may transmit the initial transmission using the periodic resources. Also, 1316 may be performed by the data communication component 1644.

At 1318, the UE may transmit the one or more retransmissions using the aperiodic resources. The periodic resources may be determined based on the SCI transmitted from the UE at 1314. The aperiodic resources may be determined based on the SCI transmitted from the UE at 1314. The initial transmission and the one or more retransmissions may be for a same packet or a same transport block. For example, at 1122, the transmitting UE 1102 may transmit the one or more retransmissions using the aperiodic resources. Also, 13 1318 may be performed by the data communication component 1644.

Figure 14:
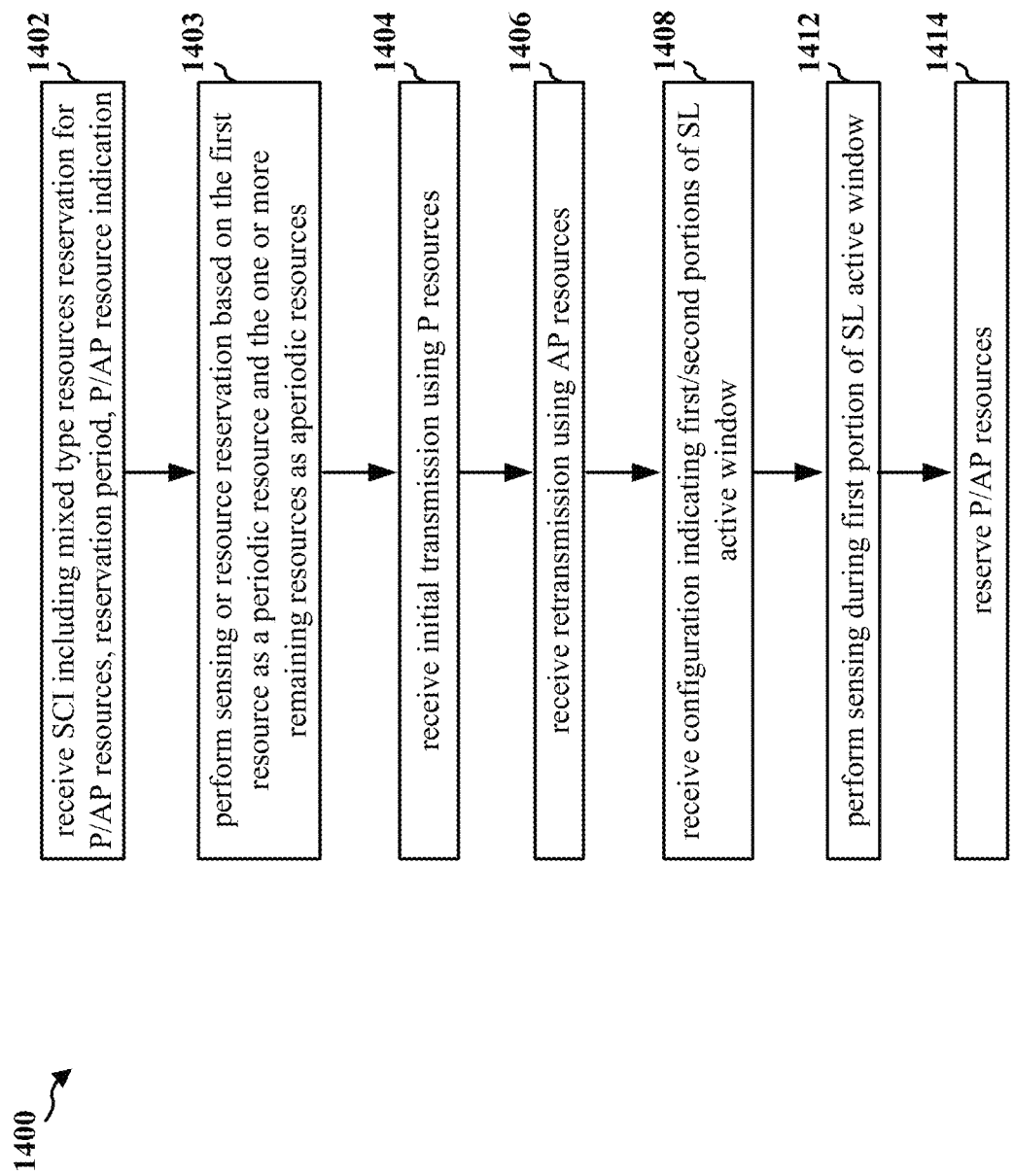
FIG. 14 is a flowchart of a method of wireless communication.

FIG. 14 is a flowchart 1400 of a method of wireless communication. The method may be performed by a sensing UE (e.g., the sensing UE 1104; the apparatus 1602). The UE may receive the SCI and determine the periodic resources and the aperiodic resources, perform sensing during a portion of the sidelink active window, and determine the reserved periodic resources and the reserved aperiodic resources.

At 1402, the UE may receive the SCI indicating the set of resources for the sidelink transmission from a transmitting UE. The SCI may further indicate a mixed type resource reservation for periodic and aperiodic resources, and a resource reservation period, wherein periodic resources in the set of resources occur in multiple periods and aperiodic resources in the set of resources occur within the indicated period. The SCI may include a two stage SCI, and for each sidelink resource reserved in the SCI, a first stage of the SCI may include the indication of whether a corresponding sidelink resource is a periodic type or an aperiodic type. For example, at 1118, the sensing UE 1104 may receive the SCI indicating the set of resources for the sidelink transmission from the transmitting UE 1102. Also, 1402 may be performed by a data communication component 1644.

At 1403, the UE may perform sensing or resource reservation based on the first resource as a periodic resource and the one or more remaining resources as aperiodic resources. For example, at 1119, the sensing UE 1104 may perform sensing or resource reservation based on the first resource as a periodic resource and the one or more remaining resources as aperiodic resources. Also, 1403 may be performed by a sensing component 1642.

In some aspects, the SCI may indicate that the initial transmission and the one or more retransmissions received at the UE is transmitted to the UE. Based on the SCI indicating that the UE is the intended receiver of the initial transmission and the one or more retransmissions, the UE may receive the initial transmission and the one or more retransmissions associated with the SCI.

At 1404, the UE may receive the initial transmission using the periodic resources. The periodic resources may be determined based on the SCI received by the UE at 1402. For example, at 1120, the sensing UE 1104 may receive the initial transmission using the periodic resources. Also, 1404 may be performed by the data communication component 1644.

At 1406, the UE may receive the one or more retransmissions using the aperiodic resources. The initial transmission and the one or more retransmissions may be for a same packet or a same transport block. The aperiodic resources may be determined based on the SCI received by the sensing UE 1104 at 1402. The initial transmission and the one or more retransmissions may be for a same packet or a same transport block. For example, at 1122, the sensing UE 1104 may receive the one or more retransmissions using the aperiodic resources. Also, 14 1406 may be performed by the data communication component 1644.

At 1408, the UE may receive configuration indicating the first portion and the second portion of sidelink active window. The configuration indicating the first portion and the second portion of the sidelink active window may be received from a base station. The configuration indicating the first portion may be relayed through the transmitting UE 1102 via the sidelink communication. Also, the first portion and the second portion of the sidelink active window may be configured at the UE. For example, at 1124, the sensing UE 1104 may receive configuration indicating the first portion and the second portion of sidelink active window. Also, 1408 may be performed by a mixed type resource reservation component 1640.

At 1412, the UE may perform sensing during first portion of sidelink active window. Based on the sensing performed within the first portion of the sidelink active window, the UE may determine which resources in the second portion of the sidelink active window are reserved by the transmitting UE and the other UEs, and may select the resources that are available in the second portion of the sidelink active window as the aperiodic resources for retransmission. For example, at 1128, the sensing UE 1104 may perform sensing during first portion of sidelink active window. Also, 1412 may be performed by the sensing component 1642.

At 1414, the UE may reserve the periodic resources based on a first sensing threshold and the aperiodic resources based on a second sensing threshold. The UE may use a first sensing threshold to determine the periodic resources. The UE may use a second threshold to determine the aperiodic resources. The second sensing threshold may be a second RSRP threshold. For example, at 1130, the sensing UE 1104 may reserve the periodic resources based on a first sensing threshold and the aperiodic resources based on a second sensing threshold. Also, 1414 may be performed by the mixed type resource reservation component 1640.

Figure 15:
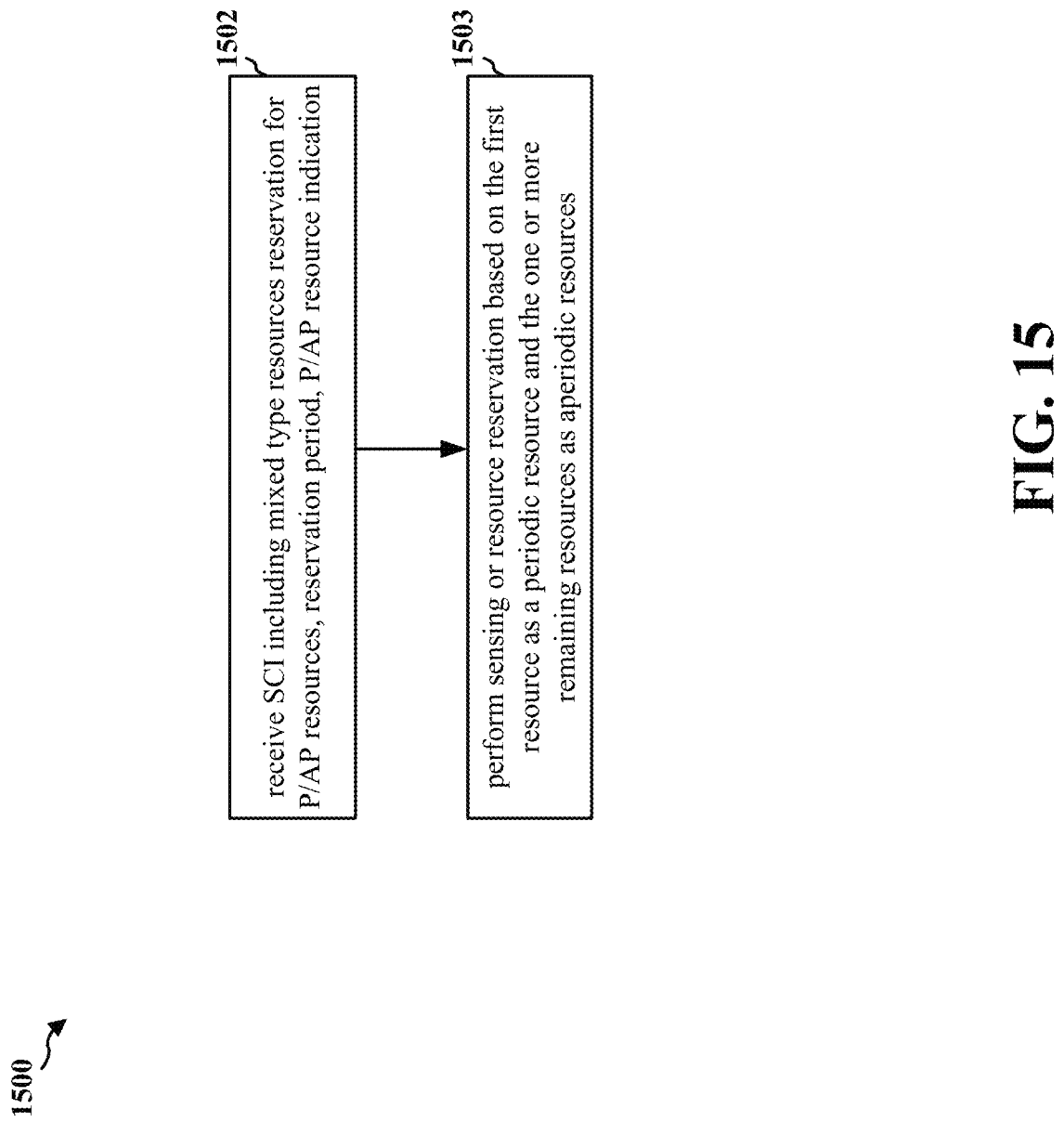
FIG. 15 is a flowchart of a method of wireless communication.

FIG. 15 is a flowchart 1500 of a method of wireless communication. The method may be performed by a sensing UE (e.g., the sensing UE 1104; the apparatus 1602). The UE may receive the SCI and determine the periodic resources and the aperiodic resources, perform sensing during a portion of the sidelink active window, and determine the reserved periodic resources and the reserved aperiodic resources.

At 1502, the UE may receive the SCI indicating the set of resources for the sidelink transmission from a transmitting UE. The SCI may further indicate a mixed type resource reservation for periodic and aperiodic resources, and a resource reservation period, wherein periodic resources in the set of resources occur in multiple periods and aperiodic resources in the set of resources occur within the indicated period. The SCI may include a two stage SCI, and for each sidelink resource reserved in the SCI, a first stage of the SCI may include the indication of whether a corresponding sidelink resource is a periodic type or an aperiodic type. For example, at 1118, the sensing UE 1104 may receive the SCI indicating the set of resources for the sidelink transmission from the transmitting UE 1102. Also, 1502 may be performed by a data communication component 1644.

At 1503, the UE may perform sensing or resource reservation based on the first resource as a periodic resource and the one or more remaining resources as aperiodic resources. For example, at 1119, the sensing UE 1104 may perform sensing or resource reservation based on the first resource as a periodic resource and the one or more remaining resources as aperiodic resources. Also, 1503 may be performed by the data communication component 1644.

Figure 16:
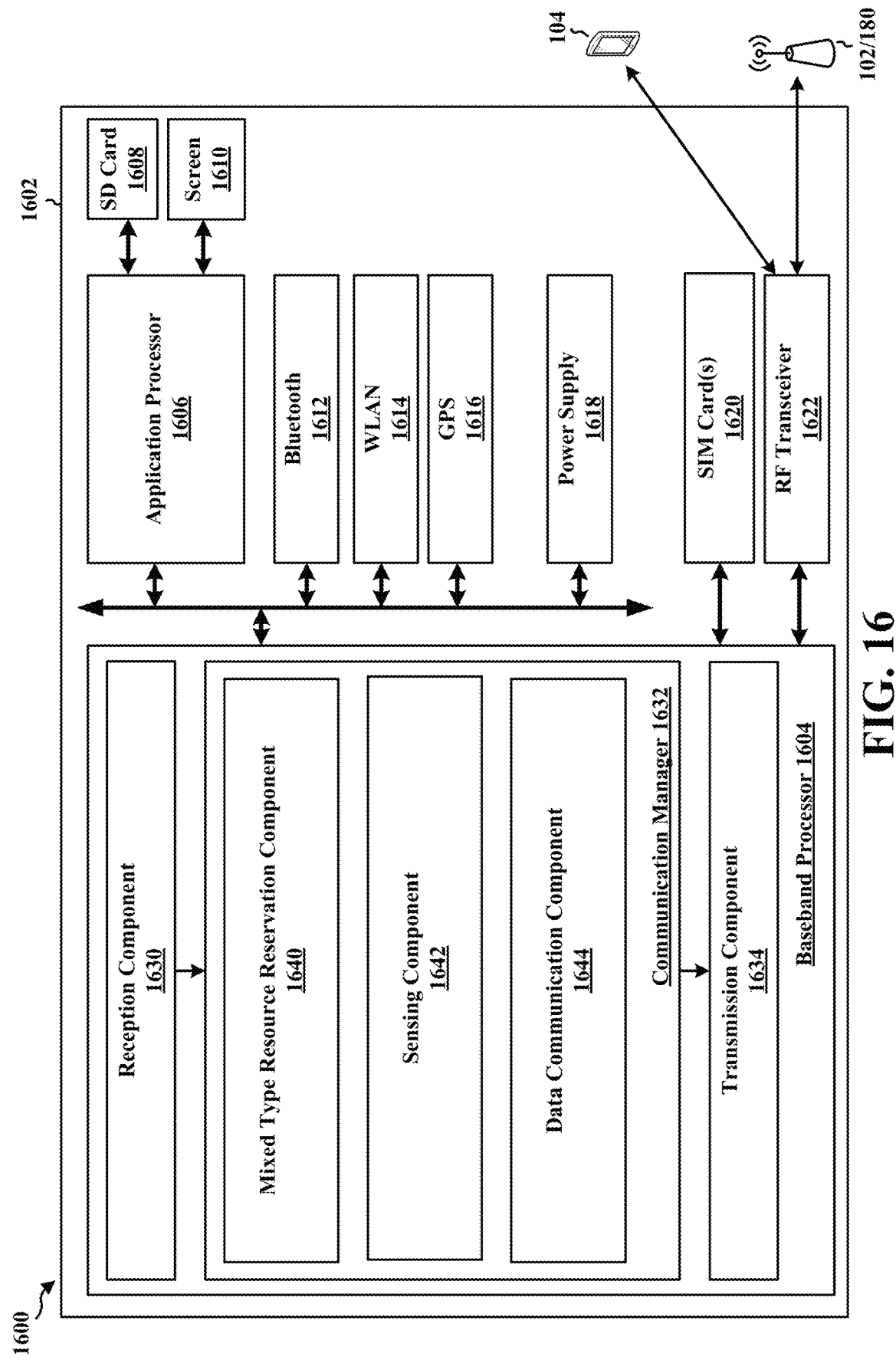
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and may be one of the transmitting UE 1102 and the sensing UE 1104. The apparatus 1602 includes a baseband processor 1604 (also referred to as a modem) coupled to an RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The baseband processor 1604 communicates through the RF transceiver 1622 with the UE 104 and/or base station 102/180. The baseband processor 1604 may include a computer-readable medium/memory. The computer-readable medium/memory may be non-transitory. The baseband processor 1604 is responsible for general processing, including the execution of software stored on the computer-readable medium/memory. The software, when executed by the baseband processor 1604, causes the baseband processor 1604 to perform the various functions described supra. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a mixed type resource reservation component 1640 that is configured to receive signaling enabling a mixed type resource reservation for the sidelink communication, receive a configuration indicating a first portion and a second portion of a sidelink active window, select the periodic resources for the initial transmission, select the aperiodic resources for the retransmission, receive configuration indicating the first portion and the second portion of sidelink active window, and reserve the periodic resources based on a first sensing threshold and the aperiodic resources based on a second sensing threshold, e.g., as described in connection with 1202, 1204, 1208, 1210, 1408, 1414, and 1514. The communication manager 1632 further includes a sensing component 1642 that is configured to perform sensing or resource reservation based on the first resource as a periodic resource and the one or more remaining resources as aperiodic resources, and perform a sensing during the first portion of the sidelink active window, and perform sensing during first portion of sidelink active window, e.g., as described in connection with 1206, 1403, 1412, and 1503. The communication manager 1632 further includes a data communication component 1644 that is configured to transmit or receive the SCI reserving periodic resources for an initial transmission and aperiodic resources for one or more retransmissions over a sidelink, transmit or receive the initial transmission using the periodic resources, and transmit or receive the one or more retransmissions using the aperiodic resources, e.g., as described in connection with 1214, 1216, 1218, 1314, 1316, 1318, 1402, 1404, 1406, and 1502.

The apparatus may include additional components that perform each of the blocks of the algorithm in the flowcharts of FIGS. 11, 12, 13, 14, 15, and 16. As such, each block in the flowcharts of FIGS. 11, 12, 13, 14, 15, and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602 as the transmitting UE, and in particular the baseband processor 1604, includes means for means for transmitting an SCI reserving periodic resources for an initial transmission and aperiodic resources for one or more retransmissions over a sidelink, means for transmitting the initial transmission using the periodic resources, and means for transmitting the one or more retransmissions using the aperiodic resources. The apparatus 1602 includes means for selecting the periodic resources for the initial transmission, and means for selecting the aperiodic resources within a period for the one or more retransmissions. The apparatus 1602 includes means for sensing during the first portion of the sidelink active window, and means for receiving a configuration indicating the first portion and the second portion of the sidelink active window.

In another configuration, the apparatus 1602 as the sensing UE, and in particular the baseband processor 1604, further includes means for receiving an SCI indicating a set of resources for a sidelink transmission from a second wireless device, means for determining a first resource in the set of resources which is periodically reserved, and means for determining one or more remaining resources in the set of resources which is aperiodically reserved. The apparatus 1602 includes means for receiving an indication in the SCI indicating a mixed type resource reservation for periodic and aperiodic resources, means for sensing during the first portion of the sidelink active window, and means for receiving a configuration indicating the first portion and the second portion of the sidelink active window.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Based on the examples of the current disclosure, the apparatus of wireless communication may include a first wireless device configured to transmit the SCI reserving periodic resources for an initial transmission and aperiodic resources for one or more retransmissions over a sidelink, transmit the initial transmission using the periodic resources, and transmit the one or more retransmissions using the aperiodic resources. The initial transmission and the one or more retransmissions may be for a same packet or a same transport block. The first wireless device may receive signaling enabling a mixed type resource reservation for sidelink communication and transmit the mixed type resource reservation based on receiving the signaling. The apparatus of wireless communication may also include a second wireless device configured to receive the SCI indicating the set of resources for the sidelink transmission from the first wireless device, determine that the first set of resources including includes a first resource that is periodically reserved and one or more remaining resources that are aperiodically reserved; and perform sensing or resource reservation based on the first resource as a periodic resource and the one or more remaining resources as aperiodic resources. The second wireless device may receive an initial transmission using the periodic resources, and receive one or more retransmissions using the aperiodic resources, where the SCI indicates that the first wireless device the initial transmission and the one or more retransmissions to the second wireless device.

The SCI may further indicate a mixed type resource reservation for periodic and aperiodic resources, and a resource reservation period, wherein periodic resources in the set of resources occur in multiple periods and aperiodic resources in the set of resources occur within the indicated period. The SCI may include a two stage SCI, and for each sidelink resource reserved in the SCI, a first stage of the SCI may include the indication of whether a corresponding sidelink resource is a periodic type or an aperiodic type. A first portion of a sidelink active window may include the periodic resources and a second portion of the sidelink active window may include the aperiodic resources, where the second portion of the sidelink active window corresponds to resources that occur after the first portion of the sidelink active window, and the first and second wireless devices may perform sensing during the first portion of the sidelink active window. The first and second wireless devices may receive a configuration indicating the first portion and the second portion of the sidelink active window or the first portion and the second portion of the sidelink active window may be configured at the first and second wireless devices.

A first sensing threshold may be used to select the periodic resources, and a second threshold may be used to select the aperiodic resources. The first sensing threshold may be a first RSRP threshold and the second sensing threshold may be a second RSRP threshold.

According to the disclosed resource reservation/allocation for partial sensing wireless device in sidelink with discontinuous reception, the wireless device may have improved chance of avoiding signaling collision with other wireless devices and the communication with the other devices may be better coordinated. Furthermore, by dividing the sidelink active window into the first portion for the periodic resource reservation and the second portion for the aperiodic resource reservation, the sidelink UE may only sense the first portion since the aperiodic resource reservation is valid only for the current sidelink activity window, further effectively utilize the periodic resources within the sidelink active window.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to transmit SCI reserving periodic resources for an initial transmission and aperiodic resources for one or more retransmissions over a sidelink, transmit the initial transmission using the periodic resources, and transmit the one or more retransmissions using the aperiodic resources.

Aspect 2 is the apparatus of aspect 1, where the initial transmission and the one or more retransmissions are for a same packet or a same transport block.

Aspect 3 is the apparatus of any of aspects 1 and 2, where the SCI further indicates a resource reservation period, and the periodic resources in the SCI occur in multiple periods and the aperiodic resources occur within the indicated period.

Aspect 4 is the apparatus of any of aspects 1 to 3, where the SCI further indicates a mixed type resource reservation for the periodic and aperiodic resources.

Aspect 5 is the apparatus of any of aspects 1 to 4, where for each sidelink resource reserved in the SCI, the SCI includes an indication of whether a corresponding sidelink resource is a periodic type or an aperiodic type.

Aspect 6 is the apparatus of aspect 5, where the SCI includes a two stage SCI, and the indication is included in a first stage of the SCI.

Aspect 7 is the apparatus of any of aspects 1 to 6, where a first retransmission is reserved in the periodic resource and a second retransmission is reserved in the aperiodic resources.

Aspect 8 is the apparatus of any of aspects 1 to 7, wherein the at least one processor and the memory are further configured to receive a signal enabling a mixed type resource reservation for sidelink communication, and the transmitting the SCI includes transmitting the mixed type resource reservation based on the received signal.

Aspect 9 is the apparatus of any of aspects 1 to 8, wherein the at least one processor and the memory are further configured to select the periodic resources for the initial transmission, and select the aperiodic resources within a period for the one or more retransmissions.

Aspect 10 is the apparatus of aspect 9, where the periodic resources are selected from a first portion of a sidelink active window and the aperiodic resources are selected from a second portion of the sidelink active window.

Aspect 11 is the apparatus of aspect 10, where the second portion of the sidelink active window corresponds to resources that occur after the first portion of the sidelink active window.

Aspect 12 is the apparatus of any of aspects 10 and 11, where the at least one processor and the memory are further configured to perform sensing during the first portion of the sidelink active window.

Aspect 13 is the apparatus of any of aspects 10 to 12, where the at least one processor and the memory are further configured to receive a configuration indicating the first portion and the second portion of the sidelink active window.

Aspect 14 is the apparatus of any of aspects 10 to 13, where the first portion and the second portion of the sidelink active window are configured at the apparatus.

Aspect 15 is the apparatus of any of aspects 9 to 14, where the periodic resources are selected based on a first sensing threshold, and the aperiodic resources are selected based on a second sensing threshold.

Aspect 16 is the apparatus of aspect 15, where the first sensing threshold includes a first RSRP threshold and the second sensing threshold includes a second RSRP threshold.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication including at least one processor coupled to a memory and configured to receive SCI indicating a set of resources for a sidelink transmission from a transmitter, determine that the first set of resources includes a first resource that is periodically reserved and one or more remaining resources that are aperiodically reserved; and perform sensing or resource reservation based on the first resource as periodic resources and the one or more remaining resources as aperiodic resources.

Aspect 21 is the apparatus of aspect 20, where the set of resources is for a same packet or a same transport block.

Aspect 22 is the apparatus of any of aspects 20 and 21, where the SCI further indicates a resource reservation period, and periodic resources in the set of resources occur in multiple periods and aperiodic resources in the set of resources occur within the indicated period.

Aspect 23 is the apparatus of any of aspects 20 to 22, where the SCI indicates a mixed type resource reservation for the periodic and aperiodic resources.

Aspect 24 is the apparatus of any of aspects 20 to 23, where for each sidelink resource reserved in the SCI, the SCI includes an indication of whether a corresponding sidelink resource is periodic type or aperiodic type.

Aspect 25 is the apparatus of aspect 24, where the SCI includes a two stage SCI, and the indication is included in a first stage of the SCI.

Aspect 26 is the apparatus of any of aspects 20 to 25, where the SCI reserves an initial transmission in the periodic resources and one or more retransmissions in the aperiodic resources.

Aspect 27 is the apparatus of any of aspects 20 to 22, where the SCI reserves a first retransmission in aperiodic resources and a second retransmission in the aperiodic resources.

Aspect 28 is the apparatus of any of aspects 20 to 22, where a first portion of a sidelink active window includes the periodic resources and a second portion of the sidelink active window includes the aperiodic resources.

Aspect 29 is the apparatus of aspect 28, where the second portion of the sidelink active window corresponds to resources that occur after the first portion of the sidelink active window.

Aspect 30 is the apparatus of any of aspects 28 and 29, where the at least one processor and the memory are further configured to perform the sensing during the first portion of the sidelink active window.

Aspect 31 is the apparatus of any of aspects 28 to 30, where the at least one processor and the memory are further configured to receive a configuration indicating the first portion and the second portion of the sidelink active window.

Aspect 32 is the apparatus of any of aspects 28 to 31, where the first portion and the second portion of the sidelink active window are configured at the apparatus.

Aspect 33, is the apparatus of any of aspects 28 to 32, where the at least one processor and the memory are further configured to receive an initial transmission using the periodic resources, and receive one or more retransmissions using the aperiodic resources, where the SCI indicates that the transmitter transmits the initial transmission and the one or more retransmissions to the apparatus.

Aspect 34 is the apparatus of any of aspects 20 to 33, where the at least one processor and the memory are further configured to reserve the periodic resources based on a first sensing threshold and the aperiodic resources based on a second sensing threshold.

Aspect 35 is the apparatus of aspect 34, where the first sensing threshold includes a first RSRP threshold and the second sensing threshold includes a second RSRP threshold.

Aspect 36 is a method of wireless communication for implementing any of aspects 20 to 35.

Aspect 37 is an apparatus for wireless communication including means for implementing any of aspects 20 to 35.

Aspect 38 is a computer-readable medium storing computer executable code, where the code when executed by a processor causes the processor to implement any of aspects 20 to 35.

What is claimed is:

1. An apparatus for wireless communication at a first wireless device, comprising:
    memory; and
    at least one processor coupled to the memory, the at least one processor configured to cause the first wireless device to:
       transmit one sidelink control information (SCI) reserving periodic resources for an initial transmission and reserving aperiodic resources for one or more retransmissions over a sidelink;
       transmit the initial transmission using the periodic resources; and transmit the one or more retransmissions using the aperiodic resources.

2. The apparatus of claim 1, wherein the one SCI further indicates a mixed type resource reservation for the periodic resources and the aperiodic resources.

3. The apparatus of claim 1, wherein for each sidelink resource reserved in the one SCI, the one SCI includes an indication of whether a corresponding sidelink resource is a periodic type or an aperiodic type.

4. The apparatus of claim 3, wherein the one SCI comprises a two stage SCI, wherein the indication is comprised in a first stage of the one SCI.

5. The apparatus of claim 1, wherein a first retransmission is reserved in the periodic resources and a second retransmission is reserved in the aperiodic resources.

6. The apparatus of claim 1, wherein the at least one processor is further configured to cause the first wireless device to:
receive a signal enabling a mixed type resource reservation for sidelink communication, wherein transmission of the one SCI comprises transmission of the mixed type resource reservation based on the signal.

7. The apparatus of claim 1, wherein the at least one processor is further configured to cause the first wireless device to:
select the periodic resources for the initial transmission; and
select the aperiodic resources within a period for the one or more retransmissions.

8. The apparatus of claim 7, wherein the at least one processor is further configured to cause the first wireless device to:
select the periodic resources from a first portion of a sidelink active window; and
select the aperiodic resources from a second portion of the sidelink active window.

9. The apparatus of claim 8, wherein the at least one processor is further configured to cause the first wireless device to:
perform sensing during the first portion of the sidelink active window.

10. The apparatus of claim 8, wherein the at least one processor is further configured to cause the first wireless device to:
receive a configuration indicating the first portion and the second portion of the sidelink active window.

11. The apparatus of claim 7, wherein the at least one processor is further configured to cause the first wireless device to:
select the periodic resources based on a first sensing threshold, and
select the aperiodic resources based on a second sensing threshold.

12. A method for wireless communication at a first wireless device, comprising:
transmitting one sidelink control information (SCI) indicating periodic resources reserved for an initial transmission and reserving aperiodic resources for one or more retransmissions over a sidelink;
transmitting the initial transmission using the periodic resources; and
transmitting the one or more retransmissions using the aperiodic resources.

13. The method of claim 12, further comprising receiving a signal enabling a mixed type resource reservation for sidelink communication, wherein transmitting the one SCI comprises transmitting the mixed type resource reservation based on the signal.

14. The method of claim 12, further comprising:
selecting the periodic resources for the initial transmission; and
selecting the aperiodic resources within a period for the one or more retransmissions.

15. The method of claim 14, wherein the periodic resources are selected from a first portion of a sidelink active window and the aperiodic resources are selected from a second portion of the sidelink active window, and the method further comprises performing sensing during the first portion of the sidelink active window.

16. The method of claim 14, wherein the periodic resources are selected from a first portion of a sidelink active window and the aperiodic resources are selected from a second portion of the sidelink active window, and the method further comprises receiving a configuration indicating the first portion and the second portion of the sidelink active window.

17. An apparatus for wireless communication at a first wireless device, comprising:
memory; and
at least one processor coupled to the memory, the at least one processor configured to cause the first wireless device to:
receive one sidelink control information (SCI) indicating a set of resources for a sidelink transmission from a second wireless device;
determine that the set of resources includes a first resource that is periodically reserved and one or more remaining resources that are aperiodically reserved; and
perform sensing or resource reservation based on the first resource as periodic resources and the one or more remaining resources as aperiodic resources.

18. The apparatus of claim 17, wherein the one SCI indicates a mixed type resource reservation for the periodic resources and the aperiodic resources.

19. The apparatus of claim 17, wherein for each sidelink resource reserved in the one SCI, the one SCI includes an indication of whether a corresponding sidelink resource is periodic type or aperiodic type.

20. The apparatus of claim 19, wherein the one SCI comprises a two stage SCI, wherein the indication is comprised in a first stage of the one SCI.

21. The apparatus of claim 17, wherein the one SCI reserves an initial transmission in the periodic resources and one or more retransmissions in the aperiodic resources.

22. The apparatus of claim 17, wherein a first portion of a sidelink active window includes the periodic resources and a second portion of the sidelink active window includes the aperiodic resources.

23. The apparatus of claim 22, wherein the at least one processor is further configured to cause the first wireless device to:
perform the sensing during the first portion of the sidelink active window.

24. The apparatus of claim 22, wherein the at least one processor is further configured to cause the first wireless device to:
receive a configuration indicating the first portion and the second portion of the sidelink active window.

25. The apparatus of claim 22, wherein the at least one processor is further configured to cause the first wireless device to:

receive an initial transmission using the periodic resources; and receive one or more retransmissions using the aperiodic resources, wherein the one SCI indicates for the first wireless device to transmit the initial transmission and the one or more retransmissions to the second wireless device.

26. The apparatus of claim 17, wherein the at least one processor is further configured to cause the first wireless device to:

reserve the periodic resources based on a first sensing threshold and the aperiodic resources based on a second sensing threshold.

27. A method for wireless communication at a first wireless device, comprising:

receiving one sidelink control information (SCI) indicating a set of resources for a sidelink transmission from a second wireless device;

determining that the set of resources includes a first resource that is periodically reserved and one or more remaining resources that are aperiodically reserved; and performing sensing or resource reservation based on the first resource as periodic resources and the one or more remaining resources as aperiodic resources.

28. The method of claim 27, wherein the one SCI indicates a mixed type resource reservation for the periodic resources and the aperiodic resources.

29. The method of claim 27, wherein a first portion of a sidelink active window includes the periodic resources and a second portion of the sidelink active window includes the aperiodic resources, and the method further comprises:

receiving an initial transmission using the periodic resources; and receiving one or more retransmissions using the aperiodic resources, wherein the one SCI indicates that the first wireless device transmits the initial transmission and the one or more retransmissions to the second wireless device.

30. The method of claim 27, wherein a first portion of a sidelink active window includes the periodic resources and a second portion of the sidelink active window includes the aperiodic resources, and the method further comprises:

reserving the periodic resources based on a first sensing threshold and the aperiodic resources based on a second sensing threshold.

\* \* \* \* \*